US012801878B2

(12) United States Patent
Takahashi et al.

(10) Patent No.: US 12,801,878 B2
(45) Date of Patent: Nov. 17, 2026

(54) INFORMATION PROCESSING SYSTEM FOR GENERATING PREDICTED IMAGE AFTER SELECTION OF CANDIDATE MEASURE

(71) Applicant: FUJIFILM BUSINESS INNOVATION CORP., Tokyo (JP)

(72) Inventors: Kazuyuki Takahashi, Kanagawa (JP); Maki Hasegawa, Kanagawa (JP); Kyotaro Tomoda, Kanagawa (JP); Kenji Sawai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 305 days.

(21) Appl. No.: 18/623,243

(22) Filed: Apr. 1, 2024

(65) Prior Publication Data

US 2024/0386229 A1 Nov. 21, 2024

(30) Foreign Application Priority Data

May 16, 2023 (JP) ................................ 2023-080604
Dec. 28, 2023 (JP) ................................ 2023-223074

(51) Int. Cl.
*G06K 15/02* (2006.01)
*G06K 15/00* (2006.01)
*G06K 15/14* (2006.01)

(52) U.S. Cl.
CPC ......... *G06K 15/027* (2013.01); *G06K 15/005* (2013.01); *G06K 15/14* (2013.01)

(58) Field of Classification Search
CPC .... G06K 15/027; G06K 15/005; G06K 15/14; H04N 1/00029; H04N 1/00045; H04N 1/0005; H04N 1/00061; H04N 1/00068; H04N 1/00079; H04N 1/00087; H04N 1/00015; H04N 1/00344
See application file for complete search history.

(56) References Cited

U.S. PATENT DOCUMENTS

2008/0137914 A1* 6/2008 Minhas ................ H04N 1/6011 382/112
2023/0033553 A1* 2/2023 Genda .................. H04N 1/0009

FOREIGN PATENT DOCUMENTS

JP H07-168484 A 7/1995
JP 2005-178170 A 7/2005
JP 2007-129652 A 5/2007
JP 2010-114673 A 5/2010
WO 2023/063988 A1 4/2023

OTHER PUBLICATIONS

Sep. 23, 2024 Extended European Search Report issued in European Patent Application No. 24168813.4.
Mar. 22, 2024 Extended Search Report issued in European Patent Application No. 23212896.7.

* cited by examiner

*Primary Examiner* — Christopher Wait
(74) *Attorney, Agent, or Firm* — Oliff PLC

(57) ABSTRACT

An information processing system includes: a processor configured to: acquire measure information serving as information regarding a measure that is allowed to be implemented on an image forming apparatus and that is specified by a user, the image forming apparatus forming an image on a recording medium; and generate a predicted image serving as an image predicted to be acquired in response to the image forming apparatus forming an image after the measure decided in accordance with the measure information is implemented.

19 Claims, 18 Drawing Sheets

INFORMATION PROCESSING SYSTEM FOR GENERATING PREDICTED IMAGE AFTER SELECTION OF CANDIDATE MEASURE

CROSS-REFERENCE TO RELATED APPLICATIONS

This application is based on and claims priority under 35 USC 119 from Japanese Patent Application Numbers. 2023-080604 filed May 16, 2023 and 2023-223074 filed Dec. 28, 2023.

BACKGROUND

(i) Technical Field

The present disclosure relates to an information processing system and a non-transitory computer readable medium.

(ii) Related Art

Japanese Unexamined Patent Application Publication No. 2005-178170 discloses a system including an image input unit that inputs image data, a unit that checks the image data and collects data processing information regarding a printer, and a reporting unit that reports a result to a server depending on the content of the information.

Japanese Unexamined Patent Application Publication No. 2007-129652 discloses an image evaluating apparatus including an image printing unit that prints an evaluation target image, an image reading unit that reads the printed evaluation target image, and a color information conversion unit that converts, to pixel values, the reflectances of respective points in the evaluation target image read by the image reading unit.

Japanese Unexamined Patent Application Publication No. 2010-114673 discloses a process for correcting image data on the basis of information regarding a printer and information related to a distance for observing a printed material.

SUMMARY

If an image forming apparatus has a malfunction, implementing a measure for the image forming apparatus enables the malfunction to be corrected.

To comprehend an influence of the measure on the image forming apparatus, the measure is actually implemented on the image forming apparatus, and then the image forming apparatus is operated. The influence is thereby comprehended.

Aspects of non-limiting embodiments of the present disclosure relate to enabling an influence of a measure implemented on an image forming apparatus without actually implementing the measure on the image forming apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including: a processor configured to: acquire measure information serving as information regarding a measure that is allowed to be implemented on an image forming apparatus and that is specified by a user, the image forming apparatus forming an image on a recording medium; and generate a predicted image serving as an image predicted to be acquired in response to the image forming apparatus forming an image after the measure decided in accordance with the measure information is implemented.

BRIEF DESCRIPTION OF THE DRAWINGS

An exemplary embodiment of the present disclosure will be described in detail based on the following figures, wherein.

DETAILED DESCRIPTION

Figure 1:
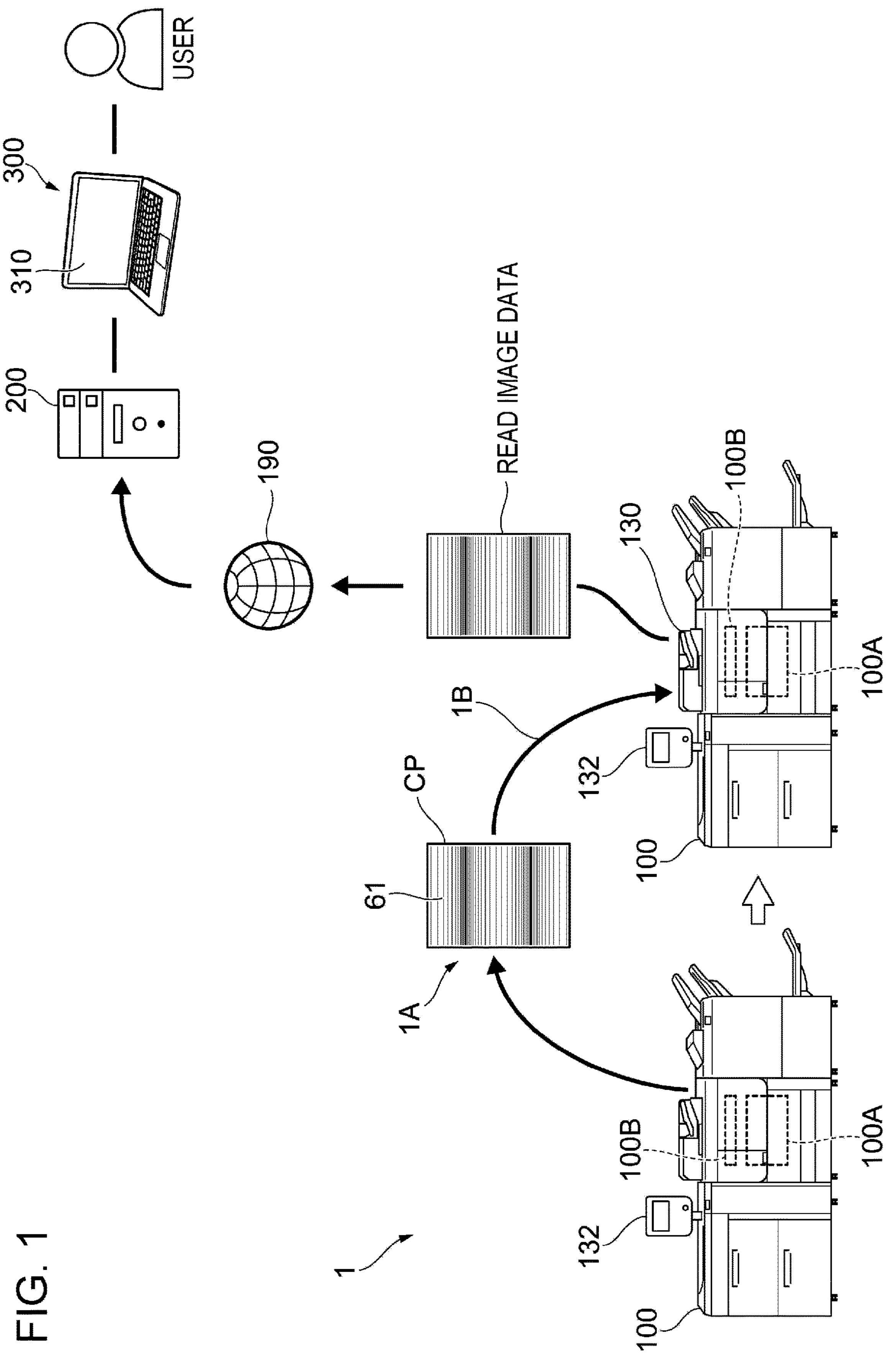
FIG. 1 is a view illustrating an example of a diagnosis system.

Hereinafter, an exemplary embodiment of the present disclosure will be described with reference to the drawing.

FIG. 1 is a view illustrating an example of a diagnosis system 1.

The diagnosis system 1 of this exemplary embodiment includes multiple image forming apparatuses 100 and a server apparatus 200 connected to the multiple image forming apparatuses 100 via a communication network 190. In this exemplary embodiment, the server apparatus 200 serving as an example of an information processing system diagnoses each image forming apparatus 100.

Further, the diagnosis system 1 includes a user terminal 300 that is connected to the server apparatus 200 and that receives an operation from a user.

FIG. 1 illustrates one of the multiple image forming apparatuses 100.

The user terminal 300 includes a display 310. The user terminal 300 is implemented by a computer. Examples of the user terminal 300 include a personal computer (PC), a smartphone, and a tablet terminal.

The image forming apparatus 100 includes an image forming section 100A that forms an image on a paper sheet serving as an example of a recording medium. The image forming section 100A serves as an example of an image forming unit.

The image forming apparatus 100 further includes an information processing section 100B. The information processing section 100B executes various processes on the image forming apparatus 100.

Figure 2:
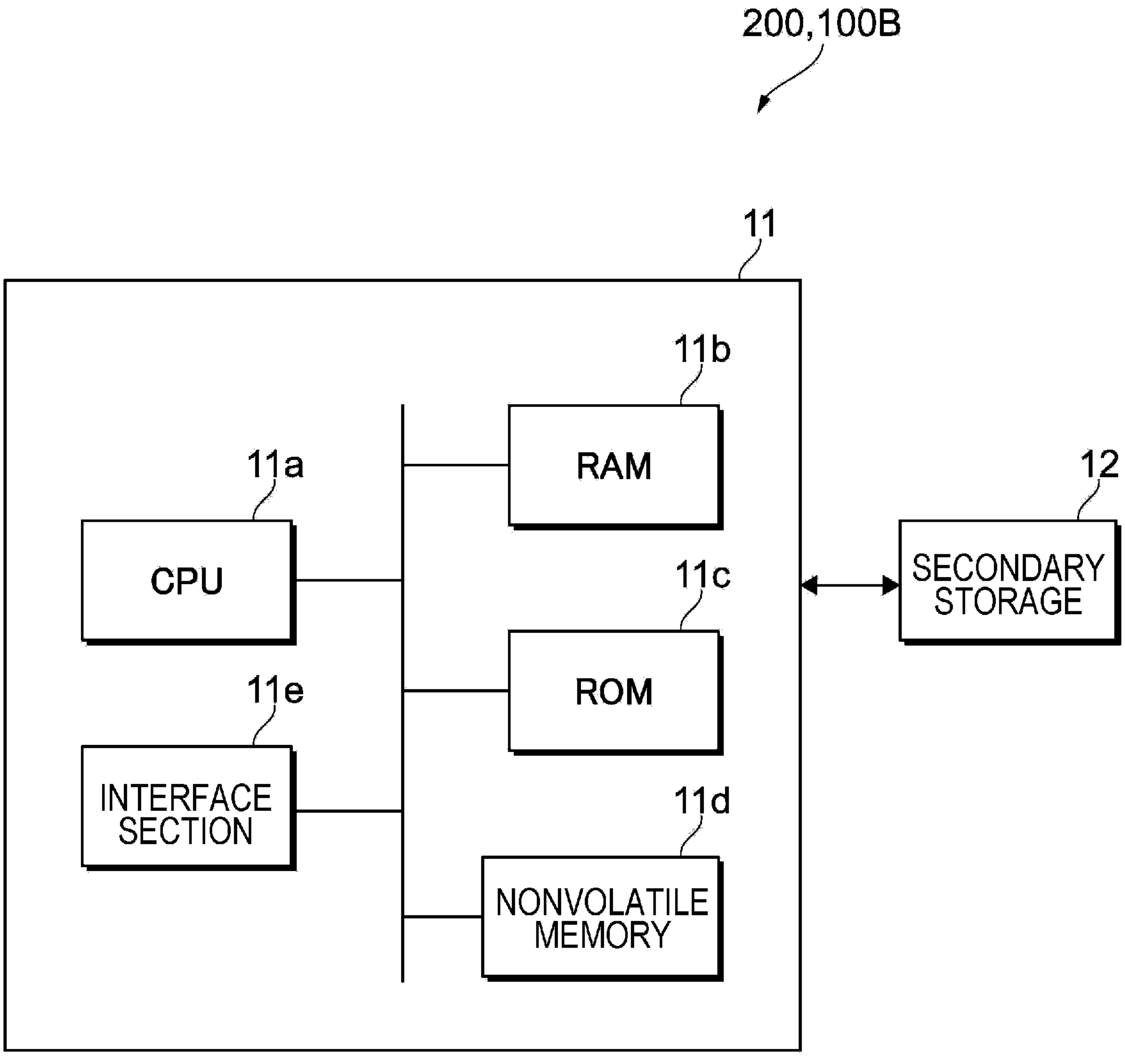
FIG. 2 is a view illustrating an example hardware configuration of a server apparatus and an information processing section included in an image forming apparatus.

FIG. 2 is a view illustrating an example hardware configuration of the server apparatus 200 and the information processing section 100B that is included in the image forming apparatus 100. The server apparatus 200 and the information processing section 100B included in the image forming apparatus 100 are each implemented by a computer.

Each of the server apparatus 200 and the information processing section 100B has a processing section 11 that performs digital arithmetic processing in accordance with a program and a secondary storage 12 that stores information.

The secondary storage 12 is implemented by an existing information memory device such as a hard disk drive (HDD), a semiconductor memory, or a magnetic tape.

The processing section 11 includes a CPU 11*a* serving as an example of a processor.

The processing section 11 also includes a RAM 11*b* used as a work memory or the like of the CPU 11*a* and a ROM 11*c* that stores programs and the like run by the CPU 11*a*.

The processing section 11 also includes a nonvolatile memory 11*d* and an interface section 11*e*. The nonvolatile memory 11*d* is rewritable and is capable of holding data at the time of power supply stop. The interface section 11*e* controls components such as a communication unit connected to the processing section 11.

The nonvolatile memory 11*d* is formed from, for example, a SRAM backed up with a battery or a flash memory. The secondary storage 12 stores not only files or the like but also programs run by the processing section 11.

In this exemplary embodiment, the processing section 11 loads a program stored in the ROM 11*c* or the secondary storage 12 and thereby performs processing.

The program run by the CPU 11*a* may be provided to the server apparatus 200 and the information processing section 100B in a state of being stored in a computer readable recording medium such as a magnetic recording medium (such as a magnetic tape or a magnetic disk), an optical recording medium (such as an optical disk), a magneto-optical recording medium, or a semiconductor memory. The program run by the CPU 11*a* may also be provided to the server apparatus 200 and the information processing section 100B by using a communication medium such as the Internet.

In this specification, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

The term "processor" is broad enough to encompass one processor or plural processors in collaboration which are located physically apart from each other but may work cooperatively. The order of operations of the processor is not limited to one described in this embodiment, and may be changed.

Processes executed by the image forming apparatus 100 among processes described below are executed by the CPU 11*a* serving as an example of a processor included in the image forming apparatus 100. Processes executed by the server apparatus 200 among the processes described below are executed by the CPU 11*a* serving as an example of a processor included in the server apparatus 200.

In the processes described above, a process related to a diagnosis of the image forming apparatus 100 is executed by the server apparatus 200 serving as the example of the information processing system. The information processing system that executes the process related to the diagnosis of the image forming apparatus 100 may be implemented by one apparatus such as the server apparatus 200 or multiple apparatuses.

The information processing system in this exemplary embodiment is composed of one apparatus in an example but may be composed of multiple apparatuses.

Figure 3:
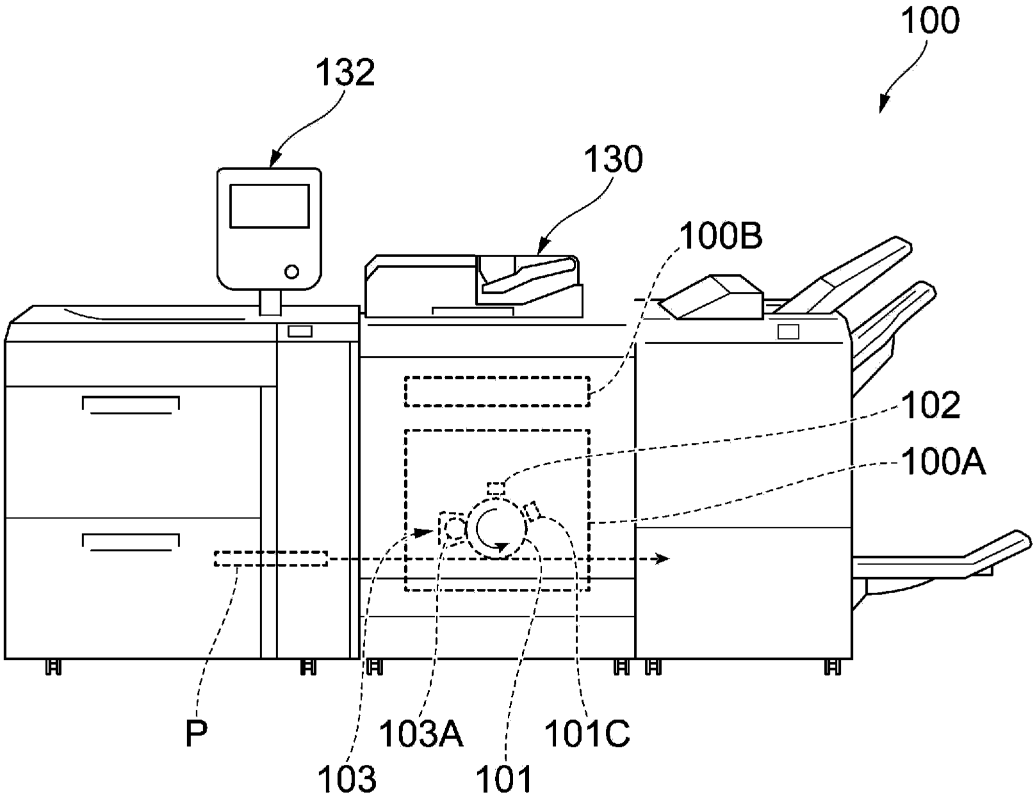
FIG. 3 is a view for explaining the image forming apparatus.

FIG. 3 is a view for explaining the image forming apparatus 100.

In this exemplary embodiment, as described above, the image forming apparatus 100 includes the image forming section 100A that forms an image on a paper sheet P serving as an example of a recording medium.

The image forming section 100A forms the image on the paper sheet P by using an electrophotographic system.

The image forming section 100A includes a photoconductor drum 101 serving as an example of an image holder. The photoconductor drum 101 rotates counterclockwise.

Further, the image forming section 100A includes a charging device 101C that charges the photoconductor drum 101, an exposure device 102 that exposes the photoconductor drum 101 to light, and a developing device 103 that develops an electrostatic latent image formed on the photoconductor drum 101 by the exposure by the exposure device 102.

The developing device 103 includes a developing roller 103A disposed in such a manner as to face the photoconductor drum 101. In this exemplary embodiment, developer adhered to the outer circumferential surface of the developing roller 103A is moved to the surface of the photoconductor drum 101, and thereby development is performed.

After the development, a toner image is formed on the photoconductor drum 101. The image is thereafter transferred onto the paper sheet P passing through the image forming section 100A, and thereby an image is formed on the paper sheet P.

The image may be transferred from the photoconductor drum 101 onto the paper sheet P with an intermediate transfer body (not illustrated) such as an intermediate transfer belt.

In addition, forming the image on the paper sheet P by the image forming section 100A is not limited to the forming with the electrophotographic system and may be performed with a different system such as an inkjet system.

The image forming apparatus 100 further includes an image reading device 130 serving as an example of an image reading unit that reads an image formed on the paper sheet serving as an example of an image reader.

The image reading device 130 is what is called a scanner having a function of transporting a paper sheet. The image reading device 130 includes a light source that emits light to the paper sheet and a light receiving unit such as charge coupled devices that receive light reflected from the paper sheet. In this exemplary embodiment, read image data to be described later is generated on the basis of the reflected light received by the light receiving unit.

A position for reading an image is set in advance in the image reading device 130, and the image reading device 130 reads an image of a portion located at the reading position of one of paper sheets transported serially.

The image forming apparatus 100 also has an information transmission function of transmitting information to the server apparatus 200 (see FIG. 1).

In the example illustrated in FIG. 3, the image reading device 130 is provided on top of the image forming apparatus 100. The image reading device 130 in order reads paper sheets (not illustrated) set by a user.

The installation of the image reading device 130 is not limited to the installation illustrated in FIG. 3. The image reading device 130 may be installed inside the image forming apparatus 100 and on a transportation path for paper sheets P.

In this case, each paper sheet P having an image formed thereon by the image forming section 100A passes through the image reading device 130 in order. At the time of passing, each image on the corresponding paper sheet P is read in order.

In this exemplary embodiment, the image reading device 130 includes a mechanism for reversing a paper sheet and is thus designed to be able to supply the turned over paper sheet to the image reading position.

In this exemplary embodiment, the paper sheet having undergone the reading of an image formed on one of the surfaces of the paper sheet may thereby be turned over and then supplied to the reading position again, and respective images on the front surface and the back surface of the paper sheet may thereby be read.

In addition to this, in reading an image on the paper sheet, the paper sheet may be placed on the platen glass (not illustrated) formed from plate-shaped glass or the like, and thus the paper sheet placed on the platen glass is read.

Further, each image forming apparatus 100 includes an operation receiving section 132 that receives an operation from the user. The operation receiving section 132 is composed of what is called a touch panel. The operation receiving section 132 displays information to the user and receives an operation performed by the user.

A device for displaying information to the user and receiving the operation by the user is not limited to the one operation receiving section 132 as in this exemplary embodiment, and an operation receiving section and an information display may be provided separately.

In this exemplary embodiment, in diagnosing the image forming apparatus 100 (see FIG. 1), the image forming section 100A is first operated, and thus a diagnostic image 61 is formed on a paper sheet P. As denoted by a reference numeral 1A, this produces a diagnostic sheet CP serving as a paper sheet P having the diagnostic image 61 formed thereon.

The diagnostic image 61 is an image for diagnosing the image forming apparatus 100 and produces the diagnostic sheet CP serving as the paper sheet P on which the diagnostic image 61 used for the diagnosis is formed in this exemplary embodiment.

After the diagnostic sheet CP is produced, the diagnostic sheet CP is set in the image reading device 130 as denoted by a reference numeral 1B in FIG. 1. The diagnostic sheet CP having the diagnostic image 61 formed thereon is then read with the image reading device 130.

This causes read image data acquired by reading the diagnostic sheet CP to be generated.

In this exemplary embodiment, the read image data is then transmitted to the server apparatus 200 and is stored in the server apparatus 200. The server apparatus 200 diagnoses the image forming apparatus 100 on the basis of the read image data.

In this exemplary embodiment, the user who uses the diagnosis system 1 of this exemplary embodiment such as a maintenance person who maintains the image forming apparatus 100 then accesses the server apparatus 200 and refers to the result of the diagnosis performed by the server apparatus 200.

In any of the image forming apparatuses 100, as described above, the diagnostic sheet CP is produced, the diagnostic sheet CP is read, and the read image data is generated.

The read image data is then transmitted to the server apparatus 200. In this exemplary embodiment, as described above, the server apparatus 200 then diagnoses the image forming apparatus 100.

The diagnosis process executed by the server apparatus 200 is described.

In this exemplary embodiment, the CPU 11*a* (see FIG. 2) serving as the example of the processor included in the server apparatus 200 diagnoses the image forming apparatus 100 on the basis of the read image data transmitted from the image forming apparatus 100 and acquires a diagnosis result that is the result of the diagnosis.

More specifically, the CPU 11*a* acquires the diagnosis result that is the result of the diagnosis of the diagnostic image 61 serving as the image formed on the diagnostic sheet CP, the diagnosis being performed regarding each of multiple diagnosis items.

In this exemplary embodiment, the diagnosis items are predetermined, and the CPU 11*a* of the server apparatus 200 analyzes the diagnostic image 61 included in the read image data and acquires the diagnosis result regarding each diagnosis item.

More specifically, the CPU 11*a* of the server apparatus 200 acquires the diagnosis result for each diagnosis item on the basis of, for example, a difference between a reference value predetermined regarding the diagnosis item and a corresponding one of values acquired by analyzing the diagnostic image 61.

Further, in this exemplary embodiment, the CPU 11*a* of the server apparatus 200 executes a process for deciding candidate measures to be presented to the user.

The CPU 11*a* of the server apparatus 200 decides candidate measures to be presented to the user on the basis of the diagnostic image 61 serving as an example of an image actually formed by the image forming apparatus 100.

More specifically, the CPU 11*a* of the server apparatus 200 decides the candidate measures to be presented to the user on the basis of the diagnosis result regarding the diagnosis item.

In this exemplary embodiment, diagnosis results and candidate measures are stored in the secondary storage 12 of the server apparatus 200 in association with each other.

The CPU 11*a* of the server apparatus 200 reads out measures associated with the respective diagnosis results from the secondary storage 12 and the measures thus read out are decided as candidate measures to be presented to the user.

Thereafter, the CPU 11*a* of the server apparatus 200 generates a screen to be presented to the user.

The CPU 11*a* of the server apparatus 200 is designed to include, in the screen to be generated, the diagnostic image

61 serving as the diagnosis base, diagnosis results regarding the respective diagnosis items, and the decided candidate measures.

In this exemplary embodiment, the screen to be generated includes, as the candidate measures, information regarding a replacement piece serving as a candidate component to be replaced and information regarding a correction process execution of which is suggested.

Figure 4:
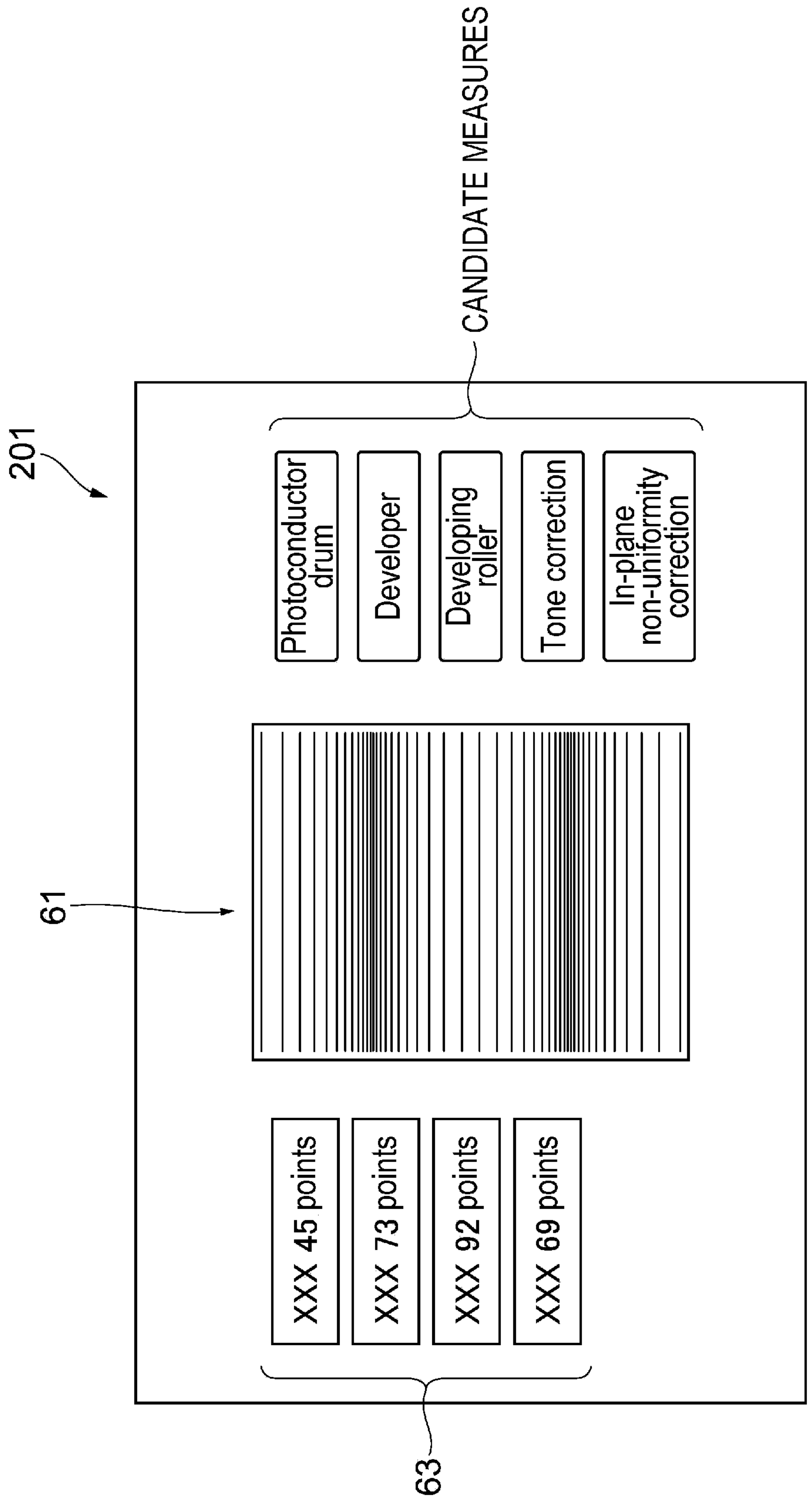
FIG. 4 is a view illustrating an example of a screen generated by a CPU of the server apparatus.

FIG. 4 is a view illustrating an example of a screen 201 generated by the CPU 11*a* of the server apparatus 200.

The screen 201 generated by the CPU 11*a* of the server apparatus 200 includes the diagnostic image 61, diagnosis results 63, and the candidate measures, as described above.

In this exemplary embodiment, the screen 201 illustrated in FIG. 4 includes the diagnosis results 63 regarding the respective diagnosis items. Each diagnosis result 63 is displayed by using a numerical value. In this exemplary embodiment, the better the result of the diagnosis, the higher the numerical value.

In the example illustrated in FIG. 4, five candidate measures that are Photoconductor drum, Developer, Developing roller, Tone correction, and In-plane non-uniformity correction are displayed as the candidate measures.

Any of the candidate measures may be implemented on the image forming apparatus 100 (see FIG. 1). Photoconductor drum, Developer, and Developing roller respectively denote that the photoconductor drum 101, the developer, and the developing roller 103A are to be replaced.

In this exemplary embodiment, the screen 201 illustrated in FIG. 4 is transmitted from the server apparatus 200 to the user terminal 300 (see FIG. 1), the screen 201 is displayed on the display 310 of the user terminal 300. The candidate measures to be implemented on the image forming apparatus 100 are thereby presented to the user.

The user specifies an intended measure by selecting one of the candidate measures presented to themselves.

After the user specifies a measure, information regarding the specified measure is transmitted to the server apparatus 200, and the server apparatus 200 acquires the information regarding the specified measure.

In this case, the CPU 11*a* of the server apparatus 200 acquires measure information serving as information regarding the measure allowed to be implemented on the image forming apparatus 100 and specified by the user.

In this exemplary embodiment, a case where the user selects and specifies one of the presented candidate measures is described as an example; however, how the user specifies a measure is not limited to this method.

For example, the user may input pieces of information regarding intended measures and may specify an intended measure on the basis of the pieces of information input by themselves.

After acquiring the measure information serving as the information regarding the measure specified by the user, the CPU 11*a* of the server apparatus 200 generates a predicted image serving as an image predicted to be acquired in response to the image forming apparatus 100 forming the image after the measure decided in accordance with the measure information is implemented.

The predicted image is not an image formed by the image forming apparatus 100 but an image generated by the server apparatus 200 serving as the example of the information processing system.

After generating the predicted image, the CPU 11*a* of the server apparatus 200 evaluates the generated predicted image and generates evaluation information regarding the predicted image.

In evaluating the predicted image, the CPU 11*a* of the server apparatus 200 evaluates the predicted image for each predetermined diagnosis item in the same manner as in the diagnostic image 61.

The CPU 11*a* of the server apparatus 200 then generates a screen 205 including the generated predicted image and the evaluation information.

Figure 5:
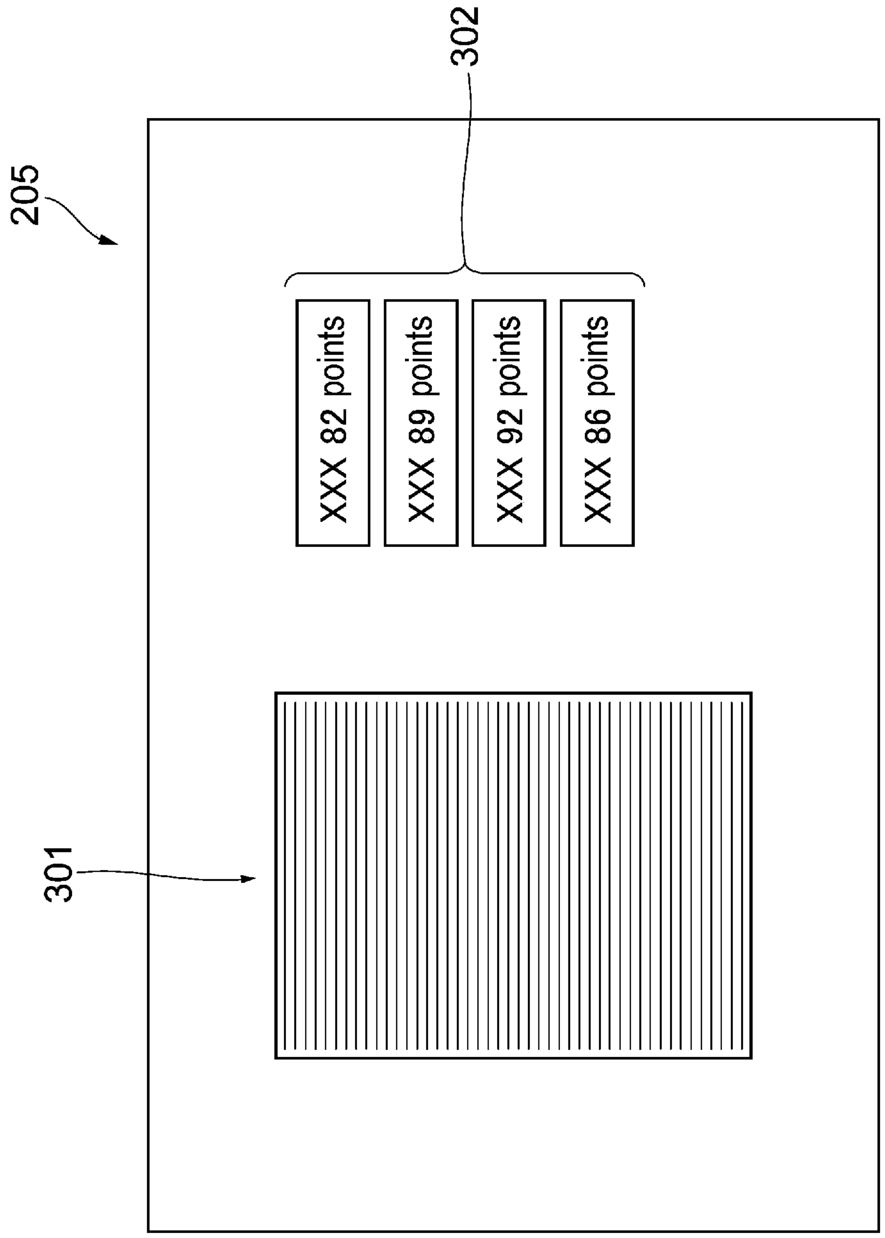
FIG. 5 is a view illustrating an example of a screen generated by the CPU of the server apparatus.

FIG. 5 is a view illustrating an example of the screen 205 generated by the CPU 11*a* of the server apparatus 200.

On the screen 205, a predicted image 301 and evaluation information 302 regarding the predicted image 301 are respectively displayed in the left part and the right part of FIG. 5.

In this exemplary embodiment, after the CPU 11*a* of the server apparatus 200 generates the screen 205, information regarding the screen 205 is transmitted to the user terminal 300 (see FIG. 1), and the screen 205 illustrated in FIG. 5 is displayed on the display 310 of the user terminal 300.

The user may thereby check the predicted image 301 predicted to be acquired by the image forming apparatus 100 if the measure specified by themselves is implemented.

In this case, the user may also check the evaluation information 302 regarding the predicted image 301 acquired after the measure is implemented. In other words, in this case, the user may check the result of a diagnosis based on the predicted image 301 for each diagnosis item.

The user may thereby check the influence of the measure on the image forming apparatus 100 without actually implementing the measure on the image forming apparatus 100.

A process for generating the predicted image 301 will be described in detail.

In generating the predicted image 301, the CPU 11*a* of the server apparatus 200 first acquires read image data acquired in such a manner that the image reading device 130 (see FIG. 1) reads the diagnostic sheet CP.

The read image data is read image data acquired by reading the diagnostic image 61 that is an image actually formed by the image forming apparatus 100 before the user specifies the measure.

In this exemplary embodiment, in generating the predicted image 301, the CPU 11*a* of the server apparatus 200 first acquires the read image data serving as an example of a read image in this manner.

The CPU 11*a* of the server apparatus 200 then generates the predicted image 301 on the basis of the read image data and the measure information that is the information regarding the measure specified by the user.

More specifically, the CPU 11*a* of the server apparatus 200 first changes at least part of analysis information on the basis of the measure information. The analysis information is information acquired by analyzing the read image data.

The CPU 11*a* of the server apparatus 200 then generates the predicted image 301 on the basis of the analysis information having undergone the change. The details of the analysis information will be described later.

In this exemplary embodiment, after acquiring the read image data, the CPU 11*a* of the server apparatus 200 analyzes the read image data and acquires the analysis information acquired by analyzing the read image data. The CPU 11*a* of the server apparatus 200 then changes at least part of the analysis information on the basis of the measure information.

The CPU 11*a* of the server apparatus 200 thereafter generates the predicted image 301 on the basis of the analysis information having undergone the change.

Figure 6A:
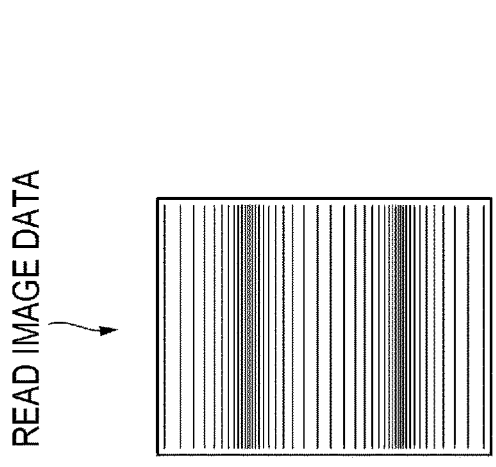
FIGS. 6A to 6D are views for explaining the details of a process for generating a predicted image.

FIGS. 6A to 6D are views for explaining the details of the process for generating the predicted image 301. FIG. 6A illustrates the read image data transmitted from the image forming apparatus 100 to the server apparatus 200.

The read image data has periodical density non-uniformity.

Figure 6B:
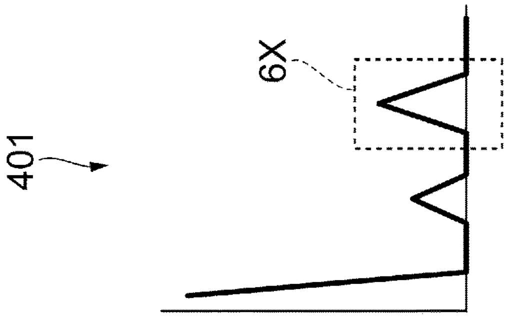

In generating the predicted image 301, the CPU 11*a* of the server apparatus 200 first analyzes the read image data illustrated in FIG. 6A and acquires analysis information 401 serving as the information acquired by analyzing the read image as illustrated in FIG. 6B.

In this example, the CPU 11*a* of the server apparatus 200 performs the Fourier transform on the read image data illustrated in FIG. 6A and acquires the analysis information 401 illustrated in FIG. 6B.

The case where the CPU 11*a* of the server apparatus 200 analyzes the read image data has herein been described; however, an apparatus different from the server apparatus 200 may analyze the read image data and acquire the analysis information 401. The CPU 11*a* of the server apparatus 200 may acquire the analysis information 401 acquired by the different apparatus.

Thereafter, in the waveform decided in accordance with the analysis information 401 illustrated in FIG. 6B, the CPU 11*a* of the server apparatus 200 corrects a waveform present in a part corresponding to the natural frequency of the replacement piece decided in accordance with the measure information. The waveform is corrected appropriately for the replacement piece.

If the measure decided in accordance with the measure information is replacing the replacement piece, the CPU 11*a* of the server apparatus 200 corrects the waveform present in the part corresponding to the natural frequency of the replacement piece in the waveform decided in accordance with the analysis information 401. The waveform is corrected appropriately for the replacement piece.

In this exemplary embodiment, the CPU 11*a* of the server apparatus 200 corrects the waveform present in the part corresponding to the natural frequency of the replacement piece, appropriately for the replacement piece assumed to be in the initial state.

FIGS. 6A to 6D illustrate a case where the measure decided in accordance with the measure information is replacing the photoconductor drum 101 serving as an example of a replacement piece.

In this case, the CPU 11*a* of the server apparatus 200 corrects the waveform present in the part corresponding to the natural frequency of the photoconductor drum 101 in the waveform decided in accordance with the analysis information 401 illustrated in FIG. 6B, appropriately for the photoconductor drum 101 assumed to be in the initial state.

More specifically, in FIG. 6B, the waveform present in the part corresponding to the natural frequency of the photoconductor drum 101 is a waveform denoted by a reference numeral 6X. The CPU 11*a* of the server apparatus 200 corrects the waveform denoted by the reference numeral 6X appropriately for the photoconductor drum 101 assumed to be in the initial state.

Figure 6C:
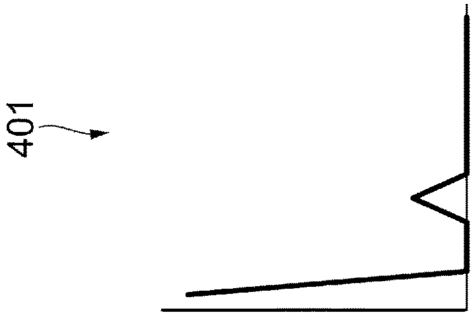

Specifically, in this case, the CPU 11*a* of the server apparatus 200 changes the waveform denoted by the reference numeral 6X to a waveform in a flat state as illustrated in FIG. 6C. In other words, in this case, the CPU 11*a* of the server apparatus 200 changes the waveform having a peak and denoted by the reference numeral 6X to the waveform not having a peak as illustrated in FIG. 6C.

The components of the image forming apparatus 100 each have a natural frequency. If a component has a malfunction, a waveform corresponding to the natural frequency of the component appears in the analysis information 401 illustrated in FIG. 6B.

In this example, in the waveform decided in accordance with the analysis information 401 illustrated in FIG. 6B, the CPU 11*a* of the server apparatus 200 corrects the waveform that is present in the part corresponding to the natural frequency of the photoconductor drum 101 and that is denoted by the reference numeral 6X, appropriately for the photoconductor drum 101 assumed to be in the initial state.

In this example, the analysis information 401 that has undergone the correction and that is in the state where the waveform having a peak is changed to the waveform not having a peak as illustrated in FIG. 6C is thereby acquired.

Thereafter, the CPU 11*a* of the server apparatus 200 performs the inverse Fourier transform on the analysis information 401 having undergone the correction. Specifically, the CPU 11*a* of the server apparatus 200 performs the inverse Fourier transform on the analysis information 401 illustrated in FIG. 6C.

Figure 6D:
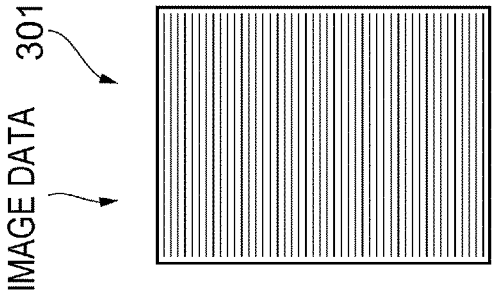

Image data with reduced periodical density non-uniformity as illustrated in FIG. 6D is thereby acquired.

In this exemplary embodiment, the CPU 11*a* of the server apparatus 200 generates, as the predicted image 301, an image decided in accordance with the image data with the reduced periodical density non-uniformity.

In this example, the read image acquired by reading the diagnostic image 61 (see FIG. 1) is in the state illustrated in FIG. 6A. This exemplary embodiment results in the change to the read image, and the predicted image 301 corresponding to the read image that has undergone the change and that is illustrated in FIG. 6D is generated.

In this example, the case where the measure information indicates the replacement of the photoconductor drum 101 has been described as an example; however, if the measure information indicates, for example, the replacement of the developing roller 103A, the analysis information 401 is corrected on the basis of the natural frequency of the developing roller 103A, and the predicted image 301 is generated on the basis of the analysis information 401 having undergone the correction.

The case where the user selects one of the measures has been described as an example.

In addition to the case, there is a case where the user selects multiple measures from the multiple candidate measures displayed on the screen 201 illustrated in FIG. 4.

In the case where the user selects multiple measures, the CPU 11*a* of the server apparatus 200 corrects the analysis information 401 in accordance with each of the measures selected by the user and generates the predicted image 301 on the basis of the analysis information 401 having undergone the correction.

Specifically, if the user selects, for example, both of the replacement of the photoconductor drum 101 and the replacement of the developing roller 103A, the CPU 11*a* of the server apparatus 200 corrects the analysis information 401 on the basis of the respective natural frequencies of the photoconductor drum 101 and the developing roller 103A.

The CPU 11*a* of the server apparatus 200 then generates the predicted image 301 on the basis of the analysis information 401 having undergone the correction.

In this exemplary embodiment, the read image data serving as the example of the read image is changed as illustrated in FIGS. 6A and 6D.

In this exemplary embodiment, the CPU 11*a* of the server apparatus 200 changes at least part of the read image on the basis of the measure information. The CPU 11*a* of the server apparatus 200 then generates the predicted image 301 corresponding to the read image having undergone the change.

The part changed on the basis of the measure information in the read image is decided on the basis of the measure information. Depending on the content of the measure information, the entirety or part of the read image is changed.

Other specific examples will be described.

Figure 7A:
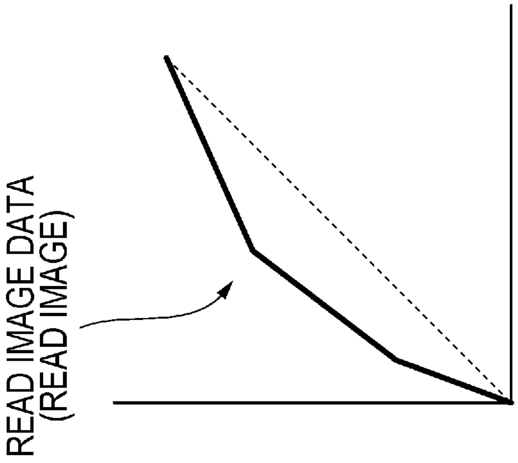
FIGS. 7A to 7C are views for explaining a process executed when a user selects tone correction as a measure.
Figure 7B:
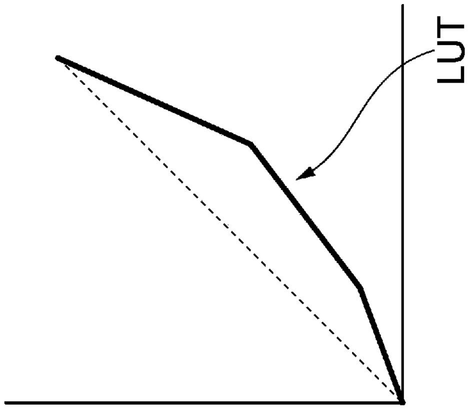
Figure 7C:
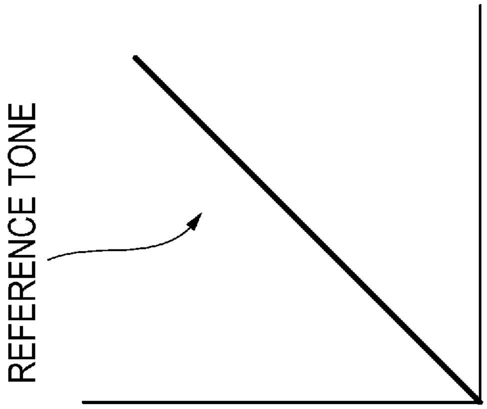

FIGS. 7A to 7C are views for explaining a process executed when the user selects Tone correction as a measure.

If the user selects Tone correction from among the candidate measures illustrated in FIG. 4, the CPU 11*a* of the server apparatus 200 corrects the read image data by using a lookup table (LUT) for making the tone of the read image decided in accordance with the read image data close to the reference tone.

More specifically, by using the LUT for making tone close to the reference tone, the CPU 11*a* of the server apparatus 200 corrects the tone in a part having a difference from the reference tone in the read image decided in accordance with the read image data.

Description is provided with reference to FIGS. 7A to 7C. FIG. 7A illustrates the tone of the read image that is acquired by analyzing the read image data. FIG. 7C illustrates the reference tone.

The CPU 11*a* of the server apparatus 200 corrects the read image data illustrated in FIG. 7A by using the LUT illustrated in FIG. 7B for making the tone of the read image illustrated in FIG. 7A close to the reference tone.

The tone of the read image is thereby made close to the reference tone illustrated in FIG. 7C.

In this case, the read image having the tone made close to the reference tone is used as the predicted image 301 (not illustrated in FIGS. 7A to 7C).

The process illustrated in FIGS. 7A to 7C causes a lower degree of tone difference in the diagnostic image 61 (see FIG. 1), and the predicted image 301 corresponding to the image having the tone closer to the reference tone is generated.

The process illustrated in FIGS. 7A to 7C corresponds to image processing performed on the read image acquired by reading the diagnostic image 61, and the predicted image 301 corresponding to the read image having undergone the image processing is generated.

Figure 8A:
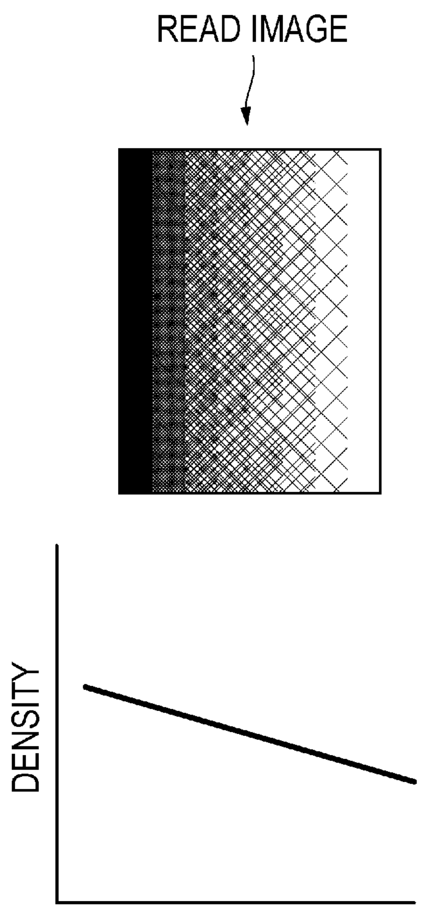
FIGS. 8A to 8C are views for explaining a process executed when the user selects in-plane non-uniformity correction as a measure.
Figure 8B:
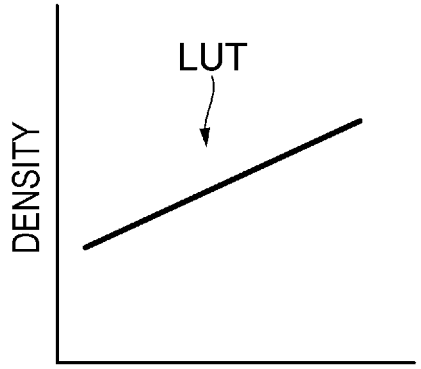
Figure 8C:
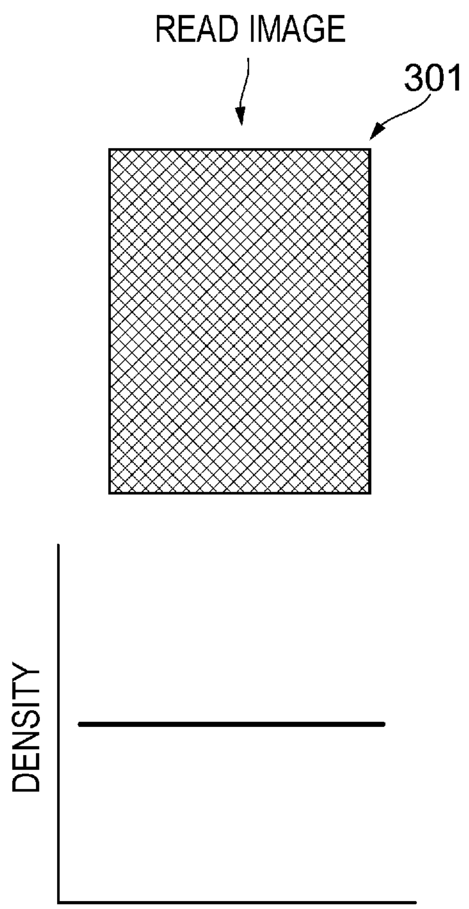

FIGS. 8A to 8C are views for explaining a process executed when the user selects In-plane non-uniformity correction as a measure.

If the user selects In-plane non-uniformity correction from among the candidate measures illustrated in FIG. 4, the CPU 11*a* of the server apparatus 200 corrects a nonuniform density part in the read image decided in accordance with the read image data by using a LUT having a phase reverse to the phase of the nonuniform density part.

The in-plane non-uniformity denotes a state where non-uniformity in density occurs in an image.

Description is specifically provided with reference to FIGS. 8A to 8C. FIG. 8A illustrates a read image decided in accordance with the read image data and the densities of the read image decided in accordance with the read image data.

In this example, the read image decided in accordance with the read image data has high density in the left portions of the read image and low density in the right portions.

In this case, the CPU 11*a* of the server apparatus 200 corrects the read image data by using the LUT illustrated in FIG. 8B for making the density of the read image close to the reference density.

More specifically, the CPU 11*a* of the server apparatus 200 corrects a nonuniform density part in the read image decided in accordance with the read image data by using the LUT having the phase reverse to the phase of the nonuniform density part.

In other words, the CPU 11*a* of the server apparatus 200 corrects the read image data by using the LUT illustrated in FIG. 8B for making the read image density close to the reference density over the entire read image.

The read image density is thereby made close to the reference density over the entire read image as illustrated in FIG. 8C.

The process illustrated FIGS. 8A to 8C causes a lower degree of density non-uniformity if the density is nonuniform in the read image. In this exemplary embodiment, the predicted image 301 corresponding to the read image illustrated in FIG. 8C with the lower degree of density non-uniformity is then generated.

The process in FIGS. 8A to 8C also corresponds to the image processing performed on the read image acquired by reading the diagnostic image 61 (see FIG. 1), and the predicted image 301 corresponding to the read image having undergone the image processing is generated.

After generating the predicted image 301, the CPU 11*a* of the server apparatus 200 generates the evaluation information 302 regarding the predicted image 301 on the basis of the predicted image 301 as described above.

More specifically, the CPU 11*a* of the server apparatus 200 diagnoses the predicted image 301 for each of the predetermined diagnosis items and acquires a diagnosis result. The CPU 11*a* of the server apparatus 200 acquires the diagnosis result as the evaluation information 302.

The CPU 11*a* of the server apparatus 200 then generates the screen 205 including the predicted image 301 and the evaluation information 302 as illustrated in FIG. 5. The generated screen 205 is transmitted from the server apparatus 200 to the user terminal 300 (see FIG. 1) and is displayed on the display 310 of the user terminal 300.

The inclusion in the screen 205 displayed on the display 310 of the user terminal 300 is not limited to the inclusion of both of the predicted image 301 and the evaluation information 302, and the screen 205 may include only one of the predicted image 301 and the evaluation information 302.

In addition, for example, respective screens including the predicted image 301 and the evaluation information 302 may be generated, and one of the predicted image 301 and the evaluation information 302 may be displayed in accordance with an instruction to perform switching between the screens by the user.

Figure 9:
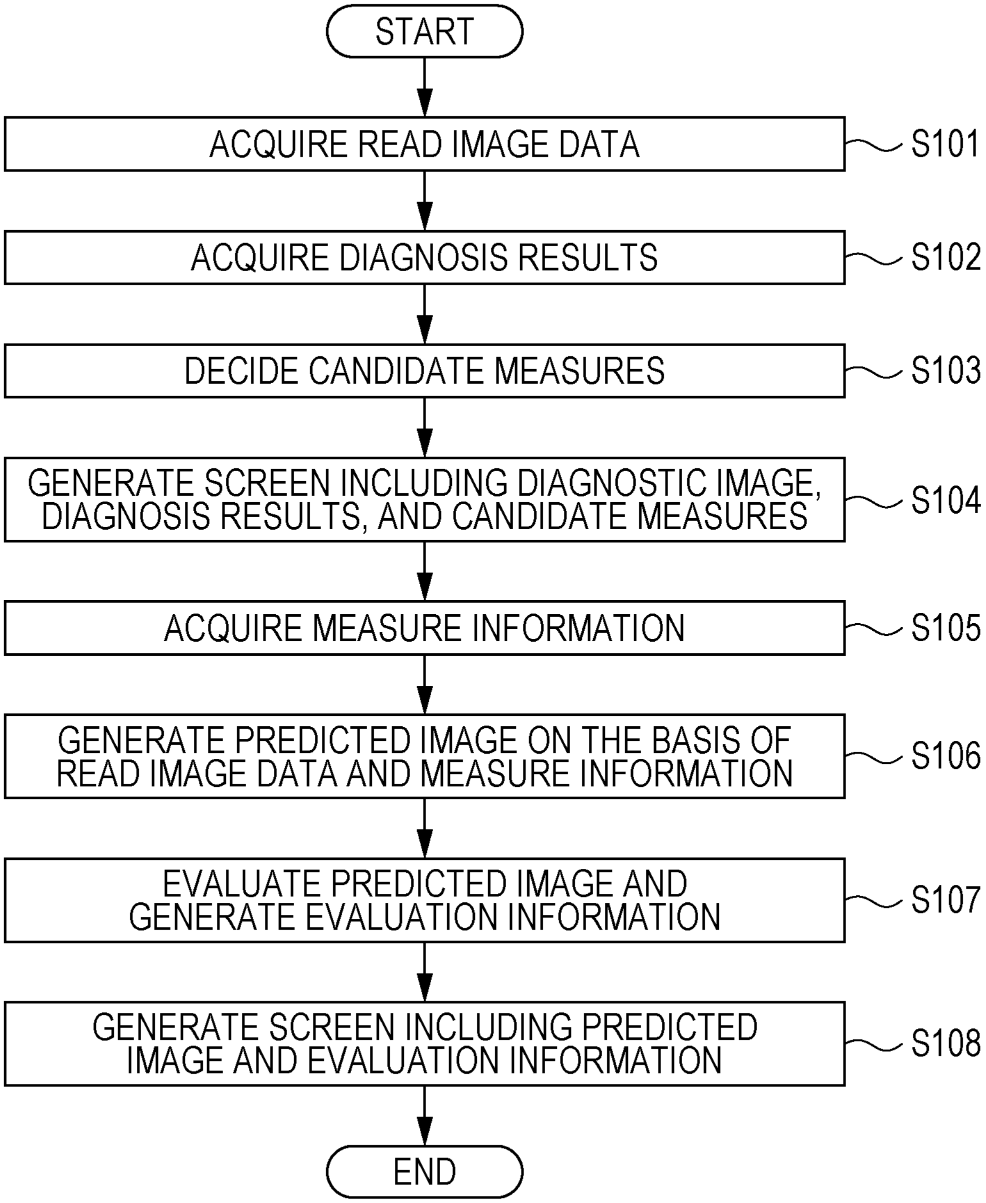
FIG. 9 is a flowchart of a process.

FIG. 9 is a flowchart of the process described above. FIG. 9 illustrates the flow of the process executed by the CPU 11*a* of the server apparatus 200.

In this exemplary embodiment, the CPU 11*a* of the server apparatus 200 first acquires read image data (step S101). The CPU 11*a* then diagnoses the diagnostic image 61 included in the read image data and acquires diagnosis results 63 regarding the diagnostic image 61 (step S102). Further, the CPU 11*a* decides candidate measures to be presented to the user on the basis of the diagnosis results 63 (step S103).

Thereafter, the CPU 11*a* generates the screen 201 illustrated in FIG. 4 and including the diagnostic image 61, the diagnosis results 63, and the candidate measures (step S104). The screen 201 is displayed on the user terminal 300, and the user specifies a measure in response to the displaying.

After the user specifies the measure, the CPU 11*a* acquires measure information (step S105).

Thereafter, the CPU 11*a* generates the predicted image 301 on the basis of the read image data and the measure information (step S106).

The CPU 11*a* then evaluates the generated predicted image 301 and generates the evaluation information 302 (step S107). The CPU 11*a* then generates the screen 205 including the predicted image 301 and the evaluation information 302 (step S108).

Others

The predicted image 301 is generated on the basis of the read image data in the description above; however, the method for generating the predicted image 301 is not limited to this method.

For example, multiple images may be stored in advance in the secondary storage 12 of the server apparatus 200. The secondary storage 12 is an example of an information memory. An image corresponding to the measure information may then be read out from the multiple images stored in the secondary storage 12 and acquired, and the acquired image may be used as the predicted image 301.

Specifically, for example, respective images corresponding to the replacement of the photoconductor drum 101, the replacement of the developer, and the replacement of the developing roller 103A are stored in advance in the secondary storage 12 of the server apparatus 200.

For example, if a measure decided in accordance with the measure information is replacing the photoconductor drum 101, the image corresponding to the replacement of the photoconductor drum 101 is read out from the secondary storage 12 and is acquired, and the image thus read out is used as the predicted image 301.

For example, if the measure decided in accordance with the measure information is replacing the developer, the image corresponding to the replacement of the developer is read out from the secondary storage 12 and is acquired, and the image thus read out is used as the predicted image 301.

For example, if the measure decided in accordance with the measure information is replacing the developing roller 103A, the image corresponding to the replacement of the developing roller 103A is read out from the secondary storage 12 and is acquired, and the image thus read out is used as the predicted image 301.

Different Example Configuration and Different Example Processing

Figure 10:
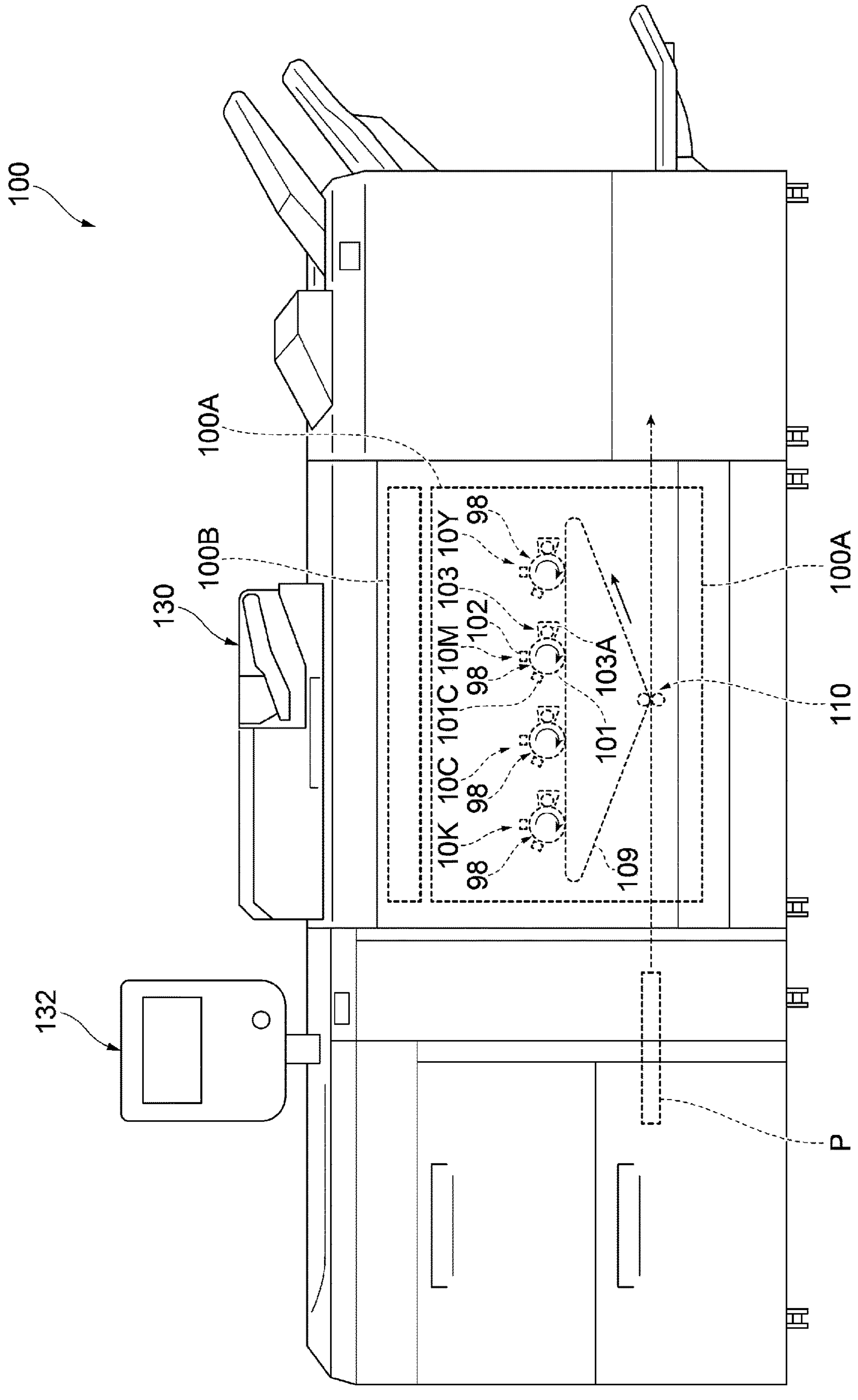
FIG. 10 is a view illustrating a different example configuration of an image forming section.

FIG. 10 is a view illustrating a different example configuration of the image forming section 100A.

In the example configuration illustrated in FIG. 10, the image forming section 100A is provided with multiple sets of the photoconductor drum 101, the charging device 101C, the exposure device 102, and the developing device 103.

In this specification, the sets of the photoconductor drum 101, the charging device 101C, the exposure device 102, and the developing device 103 are hereinafter referred to as image forming units 98.

In this example configuration illustrated in FIG. 10, the multiple image forming units 98 are provided.

In each image forming unit 98, the photoconductor drum 101 serving as an example of an image holder is charged with the charging device 101C. Light is then emitted from the exposure device 102 onto the photoconductor drum 101 charged by the charging device 101C, and the photoconductor drum 101 is thus exposed to the light.

Thereafter, by using developing device 103, a developer is adhered to the photoconductor drum 101 exposed to the light with the exposure device 102. An image is thereby formed on the photoconductor drum 101.

Each image forming unit 98 is provided on a per-color basis. The image forming unit 98 forms an image formed from toner (toner image).

In FIG. 10, one of the image forming units 98 that is denoted by reference numeral 10Y forms a yellow image, and one of the image forming units 98 that is denoted by reference numeral 10M forms a magenta image. One of the image forming units 98 that is denoted by reference numeral 10C forms a cyan image, and one of the image forming units 98 that is denoted by reference numeral 10K forms a black image.

Further, in this example configuration, the image forming section 100A is provided with an intermediate transfer belt 109 serving as an example of the transfer body onto which the images formed by the respective image forming unit 98 are transferred.

The intermediate transfer belt 109 rotates counterclockwise in FIG. 10 and thus moves circularly.

In this example configuration, the images formed by the respective image forming units 98 are transferred onto the intermediate transfer belt 109. Thereafter, the images on the intermediate transfer belt 109 are transferred, at a second transfer section 110, onto a paper sheet P transported to the second transfer section 110. An image is thereby formed on the paper sheet P.

The image forming section 100A may have a configuration without the intermediate transfer belt 109. Specifically, the image forming section 100A may have, for example, a configuration in which the images are directly transferred onto the paper sheet P from the respective image forming units 98.

Figure 11A:
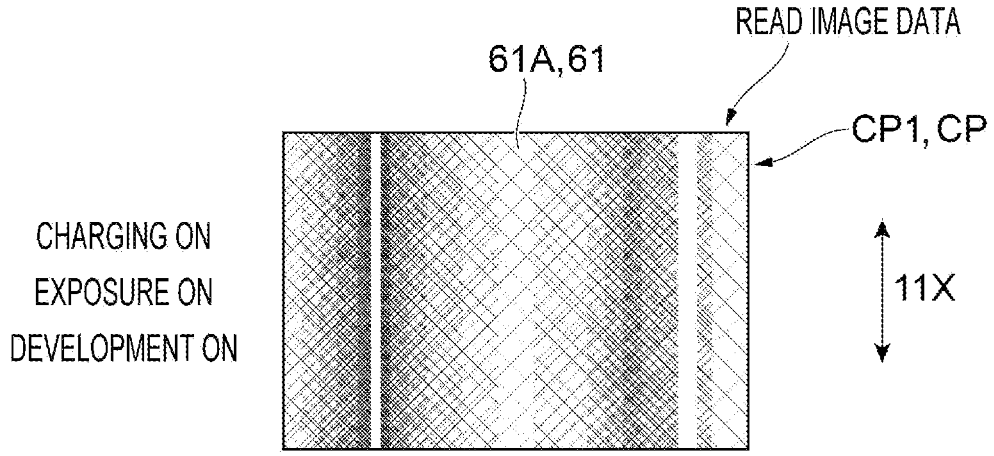
FIGS. 11A to 11C are each a view illustrating a diagnostic paper sheet generated in an image forming apparatus including the image forming section illustrated in FIG. 10.
Figure 11B:
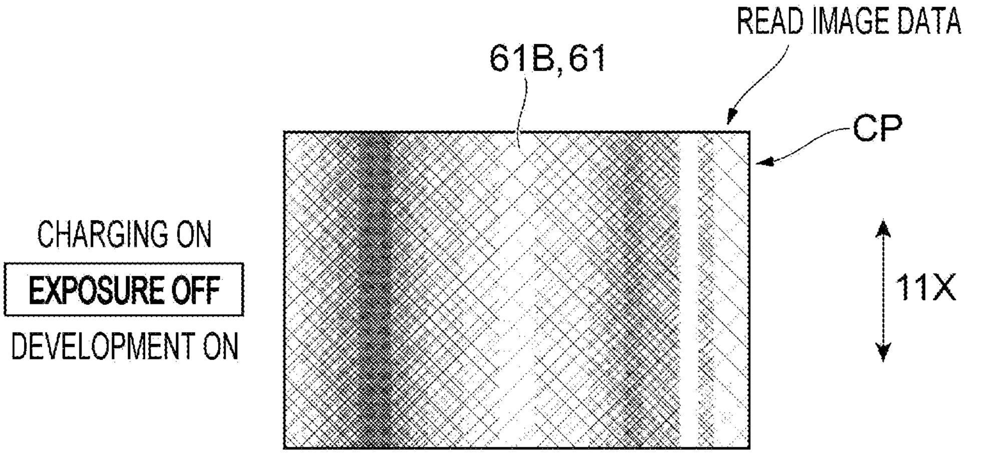
Figure 11C:
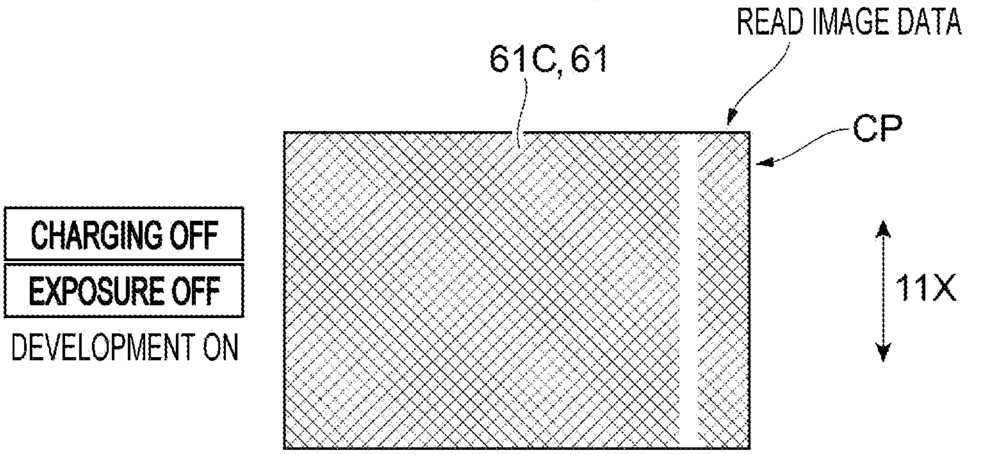

FIGS. 11A to 11C are views illustrating respective diagnostic sheets CP generated in the image forming apparatus 100 including the image forming section 100A illustrated in FIG. 10.

The multiple diagnostic sheets CP illustrated in FIGS. 11A to 11C are generated in the image forming apparatus 100. More specifically, in the image forming apparatus 100, the multiple diagnostic sheets CP are generated for each image forming units 98 (see FIG. 10).

More specifically, in the image forming apparatus 100, three diagnostic sheets CP respectively illustrated in FIGS. 11A to 11C are generated for each image forming unit 98. In other words, in the image forming apparatus 100, the three diagnostic sheets CP are generated for each color.

If one image forming unit 98 is used to thereby generate the three diagnostic sheets CP, the three remaining image forming units 98 do not form any image.

The image forming apparatus 100 including the image forming section 100A illustrated in FIG. 10 is provided with the four image forming units 98. Accordingly, in the image forming apparatus 100, a total of twelve diagnostic sheets CP are generated.

Generating the three diagnostic sheets CP for each image forming unit 98 enables a device causing an image defect on the basis of each image forming unit 98.

Hereinafter, focus is placed on one of the image forming units 98, and a process for generating the three diagnostic sheets CP for the image forming unit 98 will be described.

A process for each of the three remaining image forming units 98 is the same as the process for the image forming unit 98.

In generating the three diagnostic sheets CP for the image forming unit 98, an image forming condition for the image forming unit 98 is changed every time each diagnostic sheet CP is generated.

Specifically, the image forming condition for the image forming unit 98 is changed, as one of an operational state and a nonoperational state, for each of the charging device 101C, the exposure device 102, and the developing device 103 provided in the image forming unit 98.

The diagnostic sheet CP illustrated in FIG. 11A illustrates a diagnostic sheet CP obtained in a case where the charging device 101C, the exposure device 102, and the developing device 103 provided in the image forming unit 98 are all operational. Similarly to the above, a diagnostic image 61 is formed on the diagnostic sheet CP.

Hereinafter, the diagnostic sheet CP illustrated in FIG. 11A is referred to as a reference diagnostic sheet CP1, and the diagnostic image 61 formed on the reference diagnostic sheet CP1 is referred to as a reference diagnostic image 61A.

The diagnostic sheet CP illustrated in FIG. 11B illustrates a diagnostic sheet CP obtained under the condition that the charging device 101C and the developing device 103 provided in the image forming unit 98 are operational and the exposure device 102 is nonoperational.

A diagnostic image 61 is also formed on the diagnostic sheet CP. Hereinafter, the diagnostic image 61 is referred to as a nonexposure diagnostic image 61B.

The diagnostic sheet CP illustrated in FIG. 11C illustrates a diagnostic sheet CP obtained under the condition that only the developing device 103 provided in the image forming unit 98 is operational and the charging device 101C and the exposure device 102 are nonoperational.

A diagnostic image 61 is also formed on the diagnostic sheet CP. Hereinafter, the diagnostic image 61 is referred to as a development-exclusive diagnostic image 61C.

In FIGS. 11A to 11C, a direction in which a diagnostic sheet CP in the image forming apparatus 100 is transported in forming a diagnostic image 61 on the diagnostic sheet CP corresponds to an up or down direction in FIGS. 11A to 11C as illustrated in an arrow 11X therein.

The states of the components in generating a diagnostic image 61 will be described.

Figures 12A, 12B, 12C:
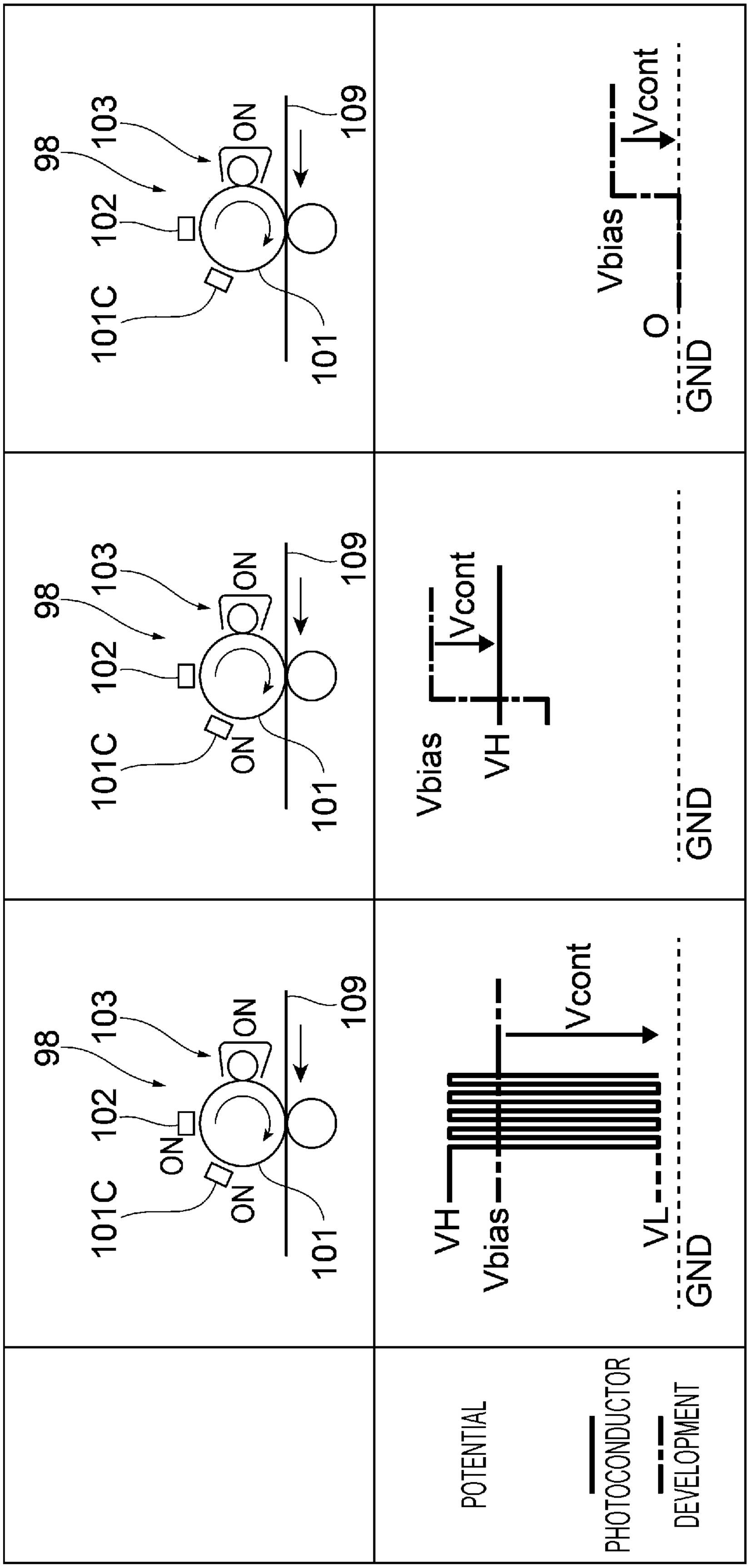
FIGS. 12A to 12C are each a view illustrating the states of components in generating a diagnostic image.

FIGS. 12A to 12C are each a view illustrating the states of the components in generating a diagnostic image 61.

FIG. 12A is a view illustrating the states of the components in generating the reference diagnostic image 61A (see FIG. 11A).

In forming the reference diagnostic image 61A, the charging device 101C, the exposure device 102, and the developing device 103 provided in the image forming unit 98 are all operated.

Specifically, in forming the reference diagnostic image 61A, the photoconductor drum 101 is charged by using the charging device 101C, and the potential of the surface of the photoconductor drum 101 is set at a charging potential VH.

Light is then emitted onto the photoconductor drum 101 by using the exposure device 102, and the potential of an image forming portion if the photoconductor drum 101 is set at a potential VL lower than a potential on the developing device 103 side.

The development is thereafter performed with the developing device 103.

Toner from the developing device 103 is adhered to the portion having the lower potential VL of the photoconductor drum 101, and an image formed from the toner is formed on the portion having the lower potential VL.

Thereafter, the image on the photoconductor drum 101 is transferred to the paper sheet P via the intermediate transfer belt 109 (see FIG. 10), and the image is formed on the paper sheet P. The reference diagnostic image 61A is thereby formed.

FIG. 12B is a view illustrating the states of the components in forming the nonexposure diagnostic image 61B.

In forming the nonexposure diagnostic image 61B, the image is formed with the image forming unit 98 after the charging device 101C and the developing device 103 are operational and the exposure device 102 is nonoperational.

More specifically, in forming the nonexposure diagnostic image 61B, for example, the potential on the developing device 103 side is made higher than the charging potential VH of the photoconductor drum 101. In forming the nonexposure diagnostic image 61B, the photoconductor drum 101 is not subjected to light exposure.

Also in this case, the toner from the developing device 103 is adhered to the outer circumferential surface of the photoconductor drum 101, and the image formed from the toner is formed on the surface of the photoconductor drum 101.

Thereafter, the image on the photoconductor drum 101 is transferred onto the paper sheet P via the intermediate transfer belt 109, and an image is formed on the paper sheet P. The nonexposure diagnostic image 61B is thereby formed.

FIG. 12C is a view illustrating the states of the components in forming the development-exclusive diagnostic image 61C.

In forming the development-exclusive diagnostic image 61C, the image is formed with the image forming unit 98 after only the developing device 103 provided in the image forming unit 98 is operational and the charging device 101C and the exposure device 102 are nonoperational.

More specifically, in forming the development-exclusive diagnostic image 61C, for example, the potential of the photoconductor drum 101 is set at zero. In addition, the potential on the developing device 103 side is made higher than the potential of the photoconductor drum 101.

Also in this case, this causes the toner from the developing device 103 to adhere to the outer circumferential surface of the photoconductor drum 101 and a toner image to be formed on the surface of the photoconductor drum 101.

Thereafter, the image on the photoconductor drum 101 is transferred onto the paper sheet P via the intermediate transfer belt 109, and the image is formed on the paper sheet P. The development-exclusive diagnostic image 61C is thereby formed.

After the three diagnostic sheets CP described above are obtained in the image forming apparatus 100, the image reading device 130 (see FIG. 1) reads the three diagnostic sheets CP.

For each of the three diagnostic sheets CP, corresponding read image data is generated.

The generated read image data is transmitted to the server apparatus 200 (see FIG. 1). The CPU 11*a* of the server apparatus 200 then acquires the read image data.

The read image data includes read image such as the reference diagnostic image 61A actually formed by the image forming apparatus 100. In this case, the CPU 11*a* of the server apparatus 200 acquires the read image acquired by reading an image actually formed by the image forming apparatus 100.

Each of the three diagnostic sheets CP described above is provided with information (not illustrated) for identifying the diagnostic sheet CP.

Specifically, in the image forming apparatus 100, a sheet-identifying image (not illustrated) that is an image representing the information for identifying the diagnostic sheet CP in addition to the diagnostic image 61 is formed on the paper sheet P when the diagnostic image 61 is formed on the paper sheet P.

The sheet-identifying image is composed of, for example, a code image such as a bar code, a character image, or the like.

Reading the diagnostic sheet CP by the image reading device 130 (see FIG. 1) and then generating the read image data cause the read image data to include the sheet-identifying image.

After acquiring the read image data transmitted from the image forming apparatus 100, the CPU 11*a* of the server apparatus 200 analyzes the sheet-identifying image included in the read image data and acquires the information for identifying the diagnostic sheet CP.

The CPU 11*a* of the server apparatus 200 thereby decides whether the read image data is read data corresponding to any one of the diagnostic sheets CP.

Reception Screen

Figure 13:
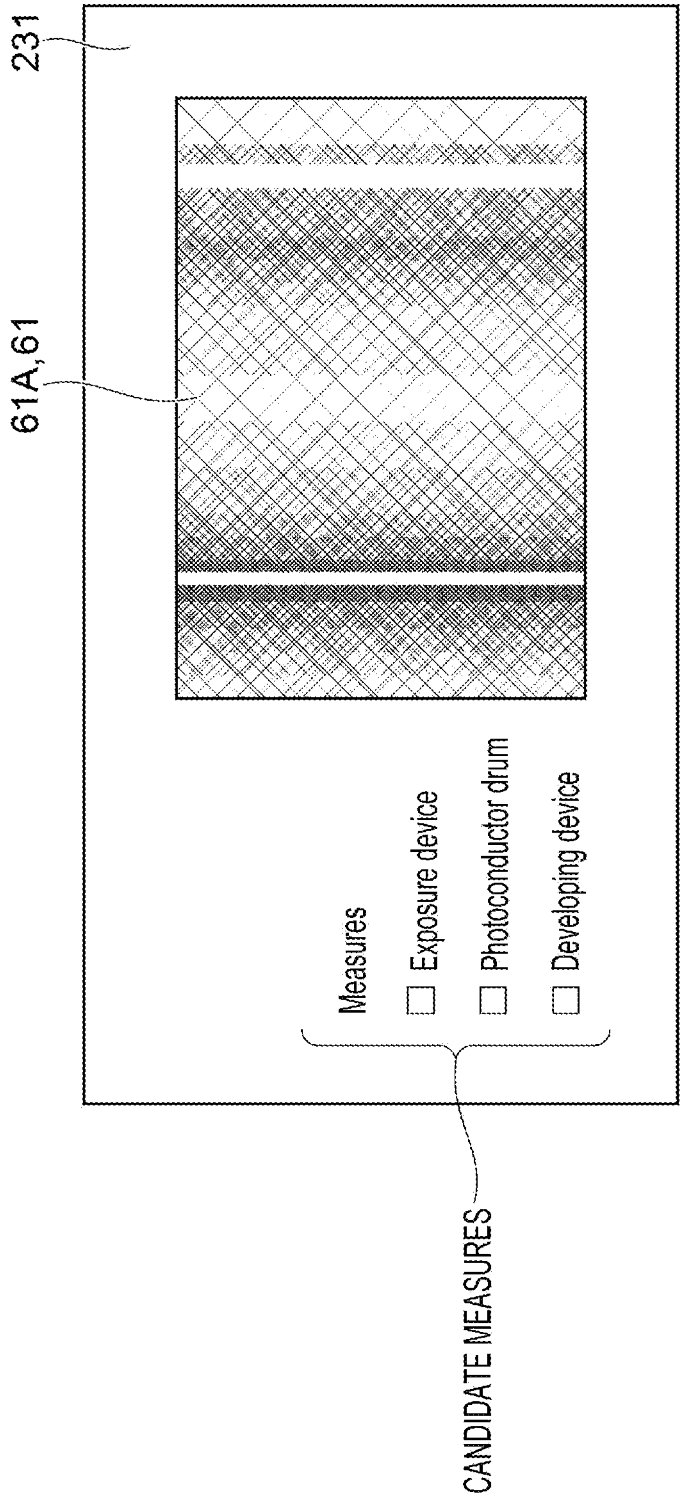
FIG. 13 is a view illustrating a reception screen.

FIG. 13 is a view illustrating a reception screen.

After acquiring the read image data transmitted from the image forming apparatus 100, the CPU 11*a* of the server apparatus 200 generates a reception screen 231 illustrated in FIG. 13 on the basis of the reference diagnostic image 61A described above included in the read image data.

The CPU 11*a* of the server apparatus 200 then transmits the generated reception screen 231 to the user terminal 300 (see FIG. 1). The reception screen 231 is thereby displayed on the display 310 of the user terminal 300.

The reception screen 231 generated by the CPU 11*a* of the server apparatus 200 includes the reference diagnostic image 61A and candidate measures.

The reference diagnostic image 61A included in the reception screen 231 is the diagnostic image 61 acquired under the condition that all of the charging device 101C, the exposure device 102, and the developing device 103 are operational, as described above.

In other words, the reference diagnostic image 61A included in the reception screen 231 is the reference diagnostic image 61A formed on the reference diagnostic sheet CP1 illustrated in FIG. 11A.

The CPU 11*a* of the server apparatus 200 acquires the reference diagnostic image 61A from the read image data of the reference diagnostic sheet CP1.

The CPU 11*a* of the server apparatus 200 then generates the reception screen 231 to include the reference diagnostic image 61A, so that the reception screen 231 includes the acquired reference diagnostic image 61A.

The CPU 11*a* of the server apparatus 200 generates the reception screen 231 to also include the candidate measures, so that the reception screen 231 includes the candidate measures.

In this processing example, the reception screen 231 includes Exposure device, Photoconductor drum, and Developing device, as the candidate measures. The reception screen 231 includes information regarding measures allowed to be implemented for the image forming apparatus 100.

In this processing example, the exposure device, the photoconductor drum, and the developing device are predetermined as the candidate measures. The reception screen 231 illustrated in in FIG. 13 includes the exposure device, the photoconductor drum, and the developing device that are predetermined as the candidate measures.

Although the candidate measures are decided on the basis of the diagnosis results of the multiple diagnosis items in the processing example illustrated in FIG. 4, the candidate measures are predetermined in this processing example illustrated in FIG. 13.

Exposure device of the candidate measures represents a measure of replacing the exposure device 102 with a new exposure device 102.

Photoconductor drum of the candidate measures represents a measure of replacing the photoconductor drum 101 and the charging device 101C with a new photoconductor drum 101 and a new charging device 101C.

The photoconductor drum 101 and the charging device 101C are provided as a unit in this exemplary embodiment, and thus Photoconductor drum of the candidate measures represents a measure of replacing not only the photoconductor drum 101 but also the charging device 101C with new ones. It is also said that Photoconductor drum is a measure of replacing the charging device 101C with a new charging device 101C.

Developing device of the candidate measures represents a measure of replacing the developing device 103 with a new developing device 103.

In this processing example, the user refers to the reception screen 231 displayed on the display 310 of the user terminal 300.

The user then selects and specifies a measure from the candidate measures included in the reception screen 231. The user selects and specifies a measure from the candidate measures presented to them.

After the user specifies a measure, measure information that is information regarding the measure specified by the user is transmitted to the server apparatus 200. In response to this, the CPU 11*a* of the server apparatus 200 acquires the measure information.

In this case, the CPU 11*a* of the server apparatus 200 acquires measure information that is information regarding a measure that is allowed to be implemented for the image forming apparatus 100 and that is specified by the user.

Thereafter, the CPU 11*a* of the server apparatus 200 generates the predicted image 301 to be described later on the basis of the acquired measure information, the reference diagnostic image 61A (see FIG. 11A) serving as an example of the read image, the nonexposure diagnostic image 61B (see FIG. 11B), and the development-exclusive diagnostic image 61C (FIG. 11C).

The predicted image 301 is an image predicted to be acquired in response to the image forming apparatus 100 forming an image after the measure decided in accordance with the measure information is implemented.

In other words, the predicted image 301 denotes an image predicted to be acquired by the image forming apparatus 100 on the assumption that the measure decided in accordance with the measure information is implemented and the image forming apparatus 100 forms an image after the measure.

Generation Process for Predicted Image 301

A generation process for the predicted image 301 will be described.

Figure 14:
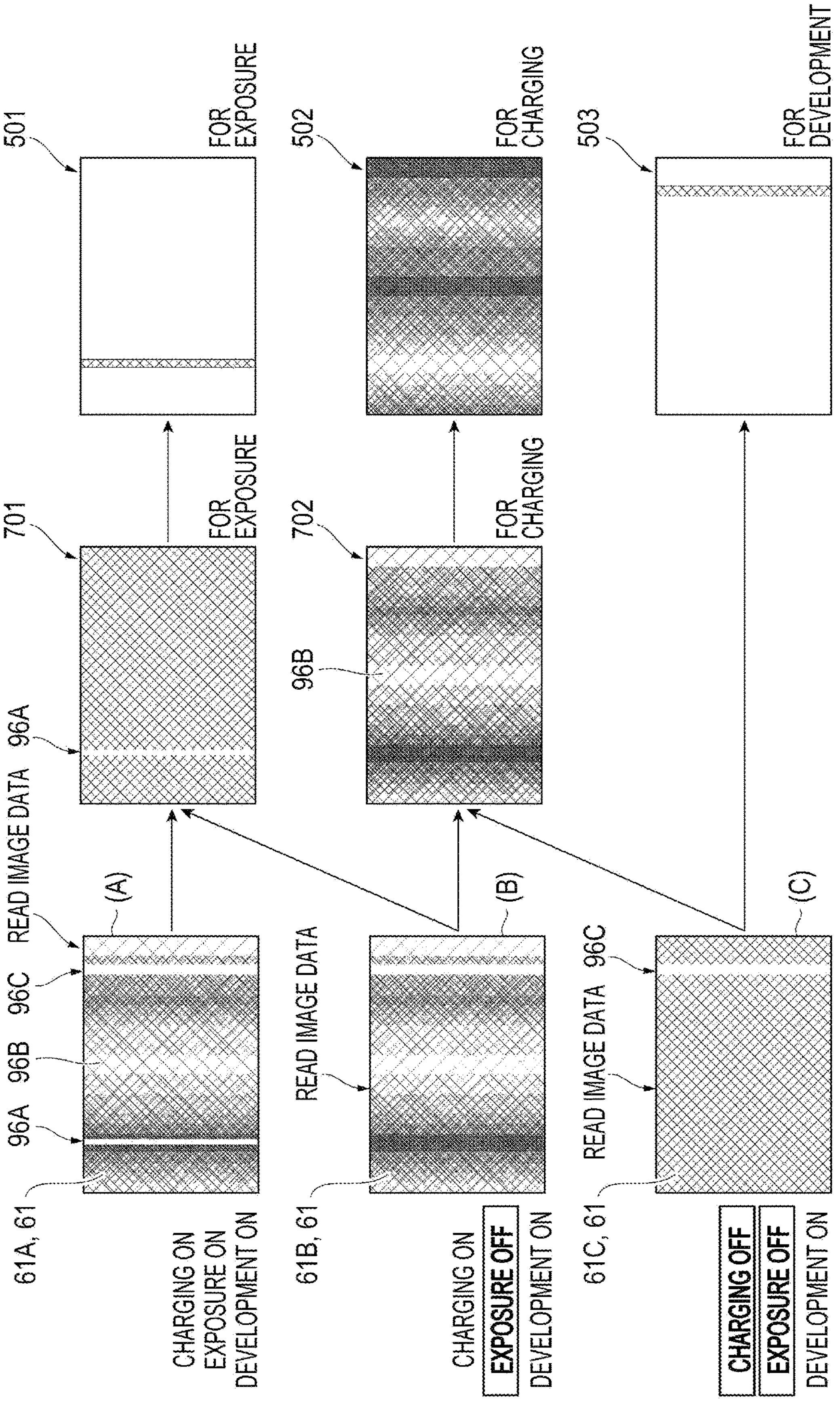
FIG. 14 illustrates a generation process for a predicted image executed by the CPU of a server apparatus.

FIG. 14 is a view for explaining the generation process for the predicted image 301 executed by the CPU 11*a* of the server apparatus 200.

The read image data illustrated in (A) to (C) in FIG. 14 is the same as that regarding the read image data illustrated in FIGS. 11A to 11C.

After acquiring the measure information transmitted from the user terminal 300, the CPU 11*a* of the server apparatus 200 starts generating the predicted image 301.

In generating the predicted image 301, the CPU 11*a* of the server apparatus 200 first generates corrective images used to correct the reference diagnostic image 61A (see (A) in FIG. 14).

The CPU 11*a* of the server apparatus 200 generates, as the corrective images, an exposure-targeted corrective image 501, a charging-targeted corrective image 502, and a development-targeted corrective image 503.

Specifically, the CPU 11*a* of the server apparatus 200 first generates, for example, the exposure-targeted corrective image 501 on the basis of the reference diagnostic image 61A denoted by (A) in FIG. 14 and the nonexposure diagnostic image 61B denoted by (B) in FIG. 14.

More specifically, the CPU 11*a* of the server apparatus 200 first generates an exposure-targeted difference image 701 on the basis of a difference between the reference diagnostic image 61A and the nonexposure diagnostic image 61B.

Specifically, the CPU 11*a* of the server apparatus 200 extracts the difference between the reference diagnostic image 61A and the nonexposure diagnostic image 61B by, for example, acquiring a difference between values of pixels constituting each of the reference diagnostic images 61A, such as a density value or a brightness value and values of pixels constituting each of the nonexposure diagnostic images 61B, such as a density value or a brightness value.

More specifically, the CPU 11*a* of the server apparatus 200 acquires a difference between two pixels located at the same coordinates among the pixels constituting the reference diagnostic image 61A and the pixels constituting the nonexposure diagnostic image 61B, as described above and extracts the difference between the reference diagnostic image 61A and the nonexposure diagnostic image 61B.

More specifically, among the multiple pixels constituting the reference diagnostic image 61A and the multiple pixels constituting the nonexposure diagnostic image 61B, the CPU 11*a* of the server apparatus 200 acquires the difference for each pair of two pixels located at the same coordinates, as described above, and extracts the difference between the reference diagnostic image 61A and the nonexposure diagnostic image 61B.

The CPU 11*a* of the server apparatus 200 then acquires the exposure-targeted difference image 701 that is an image representing the difference on the basis of the extracted difference as illustrated in FIG. 14.

The CPU 11*a* then performs a color reversal process such as black/white inversion or a density value reversal process for each pixel constituting the acquired exposure-targeted difference image 701 and thereby generates the exposure-targeted corrective image 501.

In a left part of the exposure-targeted difference image 701 in FIG. 14, a longitudinal stripe image defect (hereinafter, referred to as a left-side image defect 96A attributed to the exposure device 102) is present.

When the reference diagnostic image 61A denoted by (A) in FIG. 14 is acquired, the exposure device 102 is operational. In contrast, when the nonexposure diagnostic image 61B denoted by (B) in FIG. 14 is acquired, the exposure device 102 is nonoperational.

In this case, the left-side image defect 96A included in the exposure-targeted difference image 701 has occurred due to the exposure device 102.

Generating the exposure-targeted corrective image 501 on the basis of the exposure-targeted difference image 701 including the left-side image defect 96A leads to generating the exposure-targeted corrective image 501 that enables the left-side image defect 96A to be erased.

In this exemplary embodiment, by using the exposure-targeted corrective image 501, the predicted image 301 without the left-side image defect 96A included in the reference diagnostic image 61A is generated, as to be described later.

The CPU 11*a* of the server apparatus 200 also generates the charging-targeted corrective image 502 on the basis of the nonexposure diagnostic image 61B denoted by (B) in FIG. 14 and the development-exclusive diagnostic image 61C denoted by (C) in FIG. 14.

Specifically, the CPU 11*a* of the server apparatus 200 first extracts a difference between the nonexposure diagnostic image 61B and the development-exclusive diagnostic image 61C.

More specifically, similarly to the above, the CPU 11*a* of the server apparatus 200 acquires a difference between the value of each pixel constituting each the nonexposure diagnostic image 61B and the value of each pixel constituting each the development-exclusive diagnostic image 61C and acquires the difference between the nonexposure diagnostic image 61B and the development-exclusive diagnostic image 61C.

On the basis of the acquired difference, the CPU 11*a* of the server apparatus 200 then acquires a charging-targeted difference image 702 that is an image representing the difference, as illustrated in FIG. 14.

The CPU 11*a* then performs the reversal process on the acquired charging-targeted difference image 702 similarly to the above and generates the charging-targeted corrective image 502.

The charging-targeted difference image 702 includes an image defect that is density non-uniformity attributed to the charging device 101C (hereinafter, referred to as a density non-uniformity image defect 96B).

Note that the charging device 101C is operational when the nonexposure diagnostic image 61B denoted by (B) in FIG. 14 is acquired but the development-exclusive diagnostic image 61C denoted by (C) in FIG. 14 is nonoperational when the development-exclusive diagnostic image 61C denoted by (C) in FIG. 14 is acquired.

In this case, the density non-uniformity image defect 96B has occurred due to the charging device 101C.

Generating the charging-targeted corrective image 502 on the basis of the charging-targeted difference image 702 including the density non-uniformity image defect 96B leads to generating the charging-targeted corrective image 502 enabling the density non-uniformity image defect 96B to be erased.

In this exemplary embodiment, by using the charging-targeted corrective image 502, the predicted image 301 without the density non-uniformity image defect 96B included in the reference diagnostic image 61A is generated, as to be described later.

Further, in this processing example, the development-targeted corrective image 503 based on the development-exclusive diagnostic image 61C denoted by (C) in FIG. 14 is generated as a corrective image.

Specifically, the CPU 11*a* of the server apparatus 200 performs the reversal process on the development-exclusive diagnostic image 61C denoted by (C) in FIG. 14 similarly to the above and forms the development-targeted corrective image 503.

In the development-exclusive diagnostic image 61C, a longitudinal stripe image defect (hereinafter, referred to as a right-side image defect 96C) attributed to the developing device 103 is present.

Note that when the development-exclusive diagnostic image 61C denoted by (C) in FIG. 14, only the developing device 103 is operational.

In this case, the right-side image defect 96C has occurred due to the developing device 103.

The development-targeted corrective image 503 is used to erase the right-side image defect 96C occurring in the reference diagnostic image 61A due to the developing device 103.

Generating the development-targeted corrective image 503 on the basis of the development-exclusive diagnostic image 61C including the right-side image defect 96C leads to generating the development-targeted corrective image 503 enabling the right-side image defect 96C to be erased.

By using the development-targeted corrective image 503, the predicted image 301 without the right-side image defect 96C included in the reference diagnostic image 61A is generated, as to be described later.

As described above, the CPU 11*a* of the server apparatus 200 generates three corrective images.

Specifically, the CPU 11*a* of the server apparatus 200 generates, as corrective images, the exposure-targeted corrective image 501, the charging-targeted corrective image 502, and the development-targeted corrective image 503.

Thereafter, the CPU 11*a* of the server apparatus 200 generates the predicted image 301 by using the reference diagnostic image 61A and these corrective images.

Figure 15A:
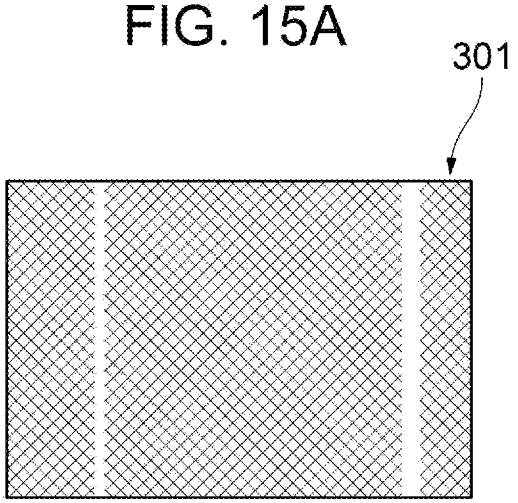
FIGS. 15A to 15C are each a view illustrating a predicted image generated by the CPU of the server apparatus.
Figure 15B:
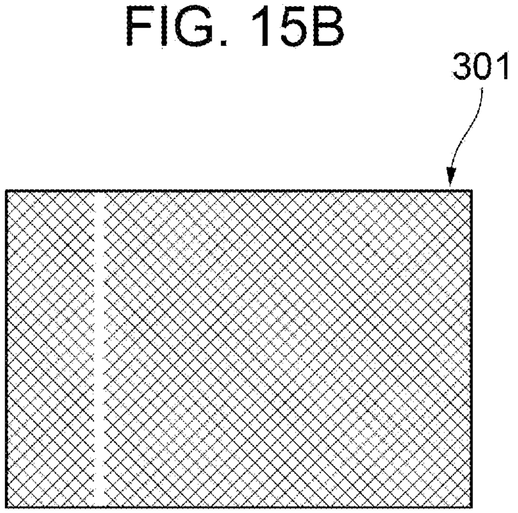
Figure 15C:
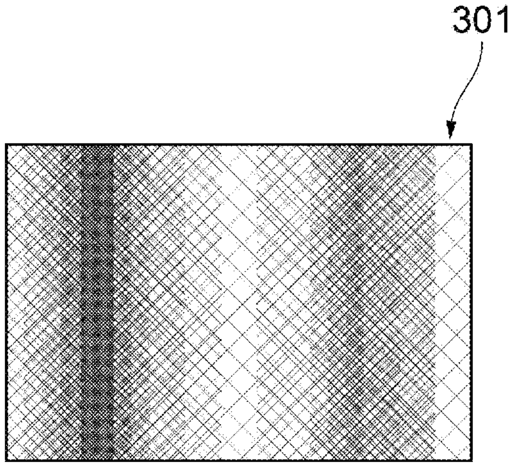

FIGS. 15A to 15C are each a view illustrating the predicted image 301 generated by the CPU 11*a* of the server apparatus 200.

In generating the predicted image 301, if the measure information transmitted from the user terminal 300 indicates, for example, the photoconductor drum 101, the CPU 11*a* of the server apparatus 200 generates the predicted image 301 illustrated in FIG. 15A by using the reference diagnostic image 61A (see (A) in FIG. 14) and the charging-targeted corrective image 502 (see FIG. 14).

If the measure information represents Photoconductor drum, the CPU 11*a* of the server apparatus 200 uses, as a corrective image used to generate the predicted image 301, the charging-targeted corrective image 502 (see FIG. 14) for the charging device 101C to be replaced together with the photoconductor drum 101.

The CPU 11*a* of the server apparatus 200 then generates the predicted image 301 illustrated in FIG. 15A by using the reference diagnostic image 61A (see (A) in FIG. 14) and the charging-targeted corrective image 502.

More specifically, the CPU 11*a* of the server apparatus 200 generates the predicted image 301 illustrated in FIG. 15A by overlapping the reference diagnostic image 61A with the charging-targeted corrective image 502.

More specifically, the CPU 11*a* of the server apparatus 200 generates the predicted image 301 illustrated in FIG. 15A by adding up the pixel value of each pixel constituting the reference diagnostic image 61A and the pixel value of each pixel constituting the charging-targeted corrective image 502 on a per-pixel basis.

In this case, as illustrated in FIG. 15A, the predicted image 301 without the density non-uniformity image defect 96B attributed to the charging device 101C is generated.

Also in this processing example, the CPU 11*a* of the server apparatus 200 changes the reference diagnostic image 61A serving as an example of the read image on the basis of the measure information and uses, as the predicted image 301, the reference diagnostic image 61A resulting from the change.

In this exemplary embodiment, if the measure information represents Photoconductor drum, the measure decided in accordance with the measure information is the measure of replacing the photoconductor drum 101 and the charging device 101C.

Accordingly, if the measure information represents Photoconductor drum, the CPU 11*a* of the server apparatus 200 generates the predicted image 301 by using the reference diagnostic image 61A and the charging-targeted corrective image 502.

A generation process for the predicted image 301 executed if the measure information represents Photoconductor drum and Developing device will then be described.

If the measure information represents Photoconductor drum and Developing device, the CPU 11*a* of the server apparatus 200 decides the charging-targeted corrective image 502 (see FIG. 14) for the photoconductor drum 101 and the development-targeted corrective image 503 for the developing device 103 as the corrective images used to generate the predicted image 301.

The CPU 11*a* of the server apparatus 200 then generates the predicted image 301 by using the reference diagnostic image 61A (see (A) in FIG. 14), the charging-targeted corrective image 502, and the development-targeted corrective image 503.

The predicted image 301 illustrated in FIG. 15B is thereby generated.

Specifically, if the measure information represents Photoconductor drum and Developing device, the CPU 11*a* of the server apparatus 200 generates the predicted image 301 illustrated in FIG. 15B by overlapping the reference diagnostic image 61A, the charging-targeted corrective image 502, and the development-targeted corrective image 503 with each other.

In this case, the predicted image 301 without the density non-uniformity image defect 96B attributed to the charging device 101C and the right-side image defect 96C attributed to the developing device 103 is generated.

A generation process for the predicted image 301 executed when the measure information represents Exposure device and Developing device will then be described.

For example, if the measure information represents Exposure device and Developing device, the CPU 11*a* of the server apparatus 200 decides the exposure-targeted corrective image 501 for the exposure device 102 (see FIG. 14) and the development-targeted corrective image 503 for the developing device 103 as the corrective images used to generate the predicted image 301.

The CPU 11*a* of the server apparatus 200 then generates the predicted image 301 illustrated in FIG. 15C by using the reference diagnostic image 61A (see (A) in FIG. 14), the exposure-targeted corrective image 501, and the development-targeted corrective image 503.

Specifically, if the measure information represents Exposure device and Developing device, the CPU 11*a* of the server apparatus 200 generates the predicted image 301 illustrated in FIG. 15C by overlapping the reference diagnostic image 61A, the exposure-targeted corrective image 501, and the development-targeted corrective image 503 with each other.

In this case, the predicted image 301 without the left-side image defect 96A attributed to the exposure device 102 and the right-side image defect 96C attributed to the developing device 103 are generated.

Generating User Screen

Figure 16A:
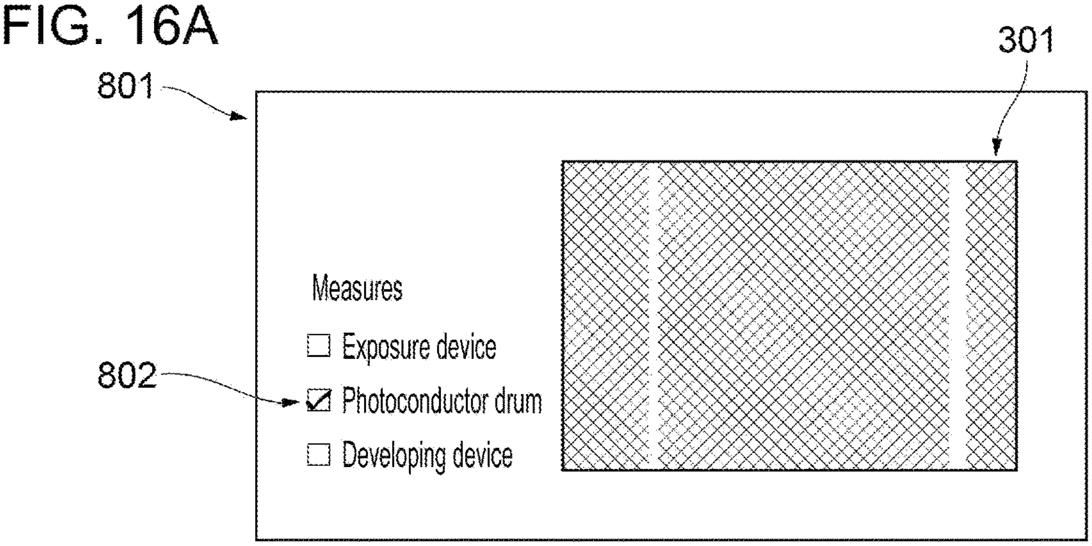
FIGS. 16A to 16C are each a view illustrating a user screen.
Figure 16B:
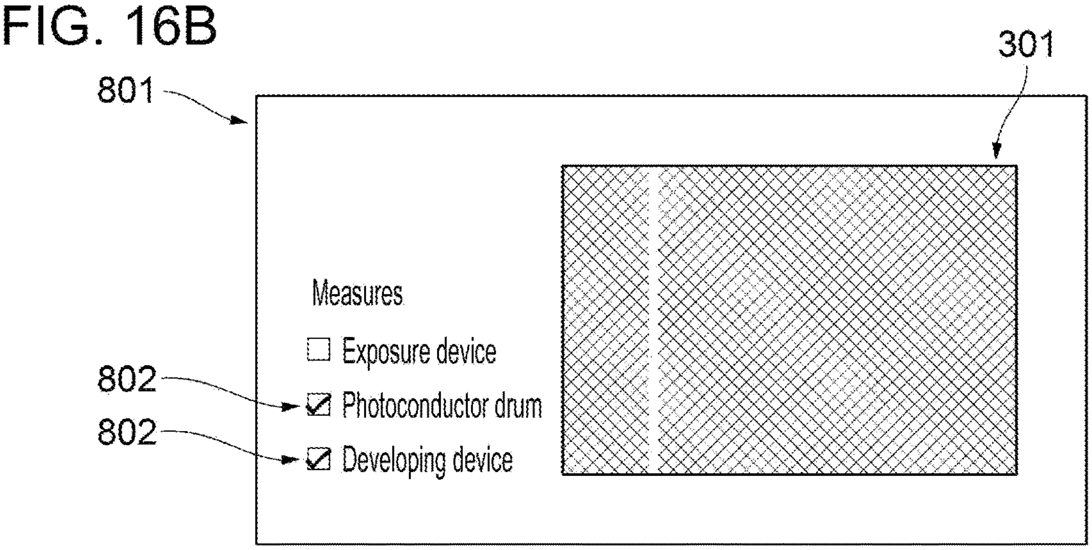
Figure 16C:
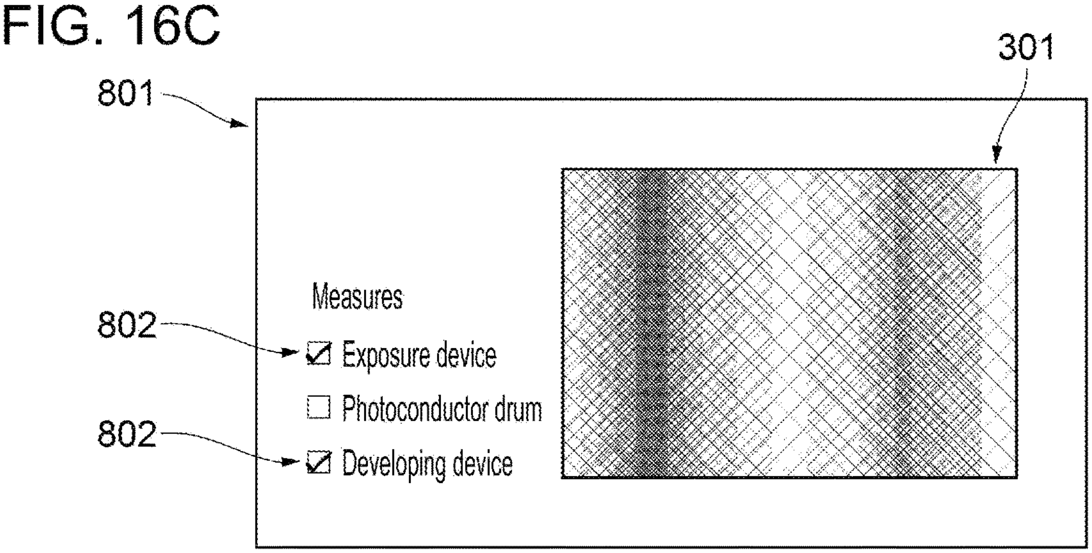

FIGS. 16A to 16C are each a view illustrating a user screen.

After generating the predicted image 301, the CPU 11*a* of the server apparatus 200 generates one of user screens 801, for example, respectively illustrated in FIGS. 16A to 16C on the basis of the generated predicted image 301 and the measure information used to generate the predicted image 301.

The CPU 11*a* of the server apparatus 200 then transmits the generated user screen 801 to the user terminal 300 (see FIG. 1). The user screen 801 is thereby displayed on the display 310 of the user terminal 300.

As the result of this, measure information regarding a measure selected by the user and the predicted image 301 on which the measure selected by the user is reflected are displayed on the display 310 of the user terminal 300.

On each user screen 801 illustrated in a corresponding one of FIGS. 16A to 16C, one or more images 802 each representing the specified measure are displayed in such a manner as to correspond to the measure specified by the user.

Displaying the image 802 on the user screen 801 illustrated in a corresponding one of FIGS. 16A to 16C causes the measure information regarding the measure specified by the user to be displayed.

Further, the predicted image 301 is displayed on the user screen 801 illustrated in a corresponding one of FIGS. 16A to 16C respectively illustrated in FIGS. 16A to 16C.

The user screen 801 illustrated in FIG. 16A is a user screen 801 for the case where the measure specified by the user represents Photoconductor drum.

On the user screen 801 illustrated in FIG. 16A, Photoconductor drum is displayed as the measure information, and the predicted image 301 without the density non-uniformity image defect 96B is displayed as the predicted image 301.

The user screen 801 illustrated in FIG. 16B is a user screen 801 for the case where the measure selected by the user represents Photoconductor drum and Developing device.

On the user screen 801 illustrated in FIG. 16B, Photoconductor drum and Developing device are displayed as the measure information, and the predicted image 301 without the density non-uniformity image defect 96B and the right-side image defect 96C is displayed as the predicted image 301.

The user screen 801 illustrated in FIG. 16C is a user screen 801 for the case where the measure selected by the user represents Exposure device and Developing device.

On the user screen 801 illustrated in FIG. 16C, Exposure device and Developing device are displayed as the measure information, and the predicted image 301 without the left-side image defect 96A and the right-side image defect 96C is displayed as the predicted image 301.

A device causing the image defect has heretofore been decided by setting each of the charging device 101C, the exposure device 102, and the developing device 103 in the operational state or the nonoperational state; however, how a device causing an image defect is decided is not limited to this.

For example, the device causing the image defect may be decided on the basis of the characteristic of the image defect appearing in the reference diagnostic image 61A (see (A) in FIG. 14).

For example, if a specific form of an image defect is present in the reference diagnostic image 61A, the device causing the image defect may be decided on the basis of the specific form.

Specifically, for example, an image defect appearing in the reference diagnostic image 61A has a predetermined specific form considered to be attributed to the charging device 101C, the charging device 101C may be decided as causing the image defect.

In this case, the device causing the image defect may be decided on the basis of only one reference diagnostic sheet CP1.

In the case where the specific form of the image defect occurs, the CPU 11*a* of the server apparatus 200 also generates a corrective image causing the image defect to be erased.

Specifically, in this case, the CPU 11*a* of the server apparatus 200 executes the reversal process, for example, on the reference diagnostic image 61A and generates the corrective image on the basis of the reference diagnostic image 61A.

The CPU 11*a* of the server apparatus 200 then generates the predicted image 301 without the specific form of the image defect described above by overlapping the reference diagnostic image 61A with the generated corrective image.

More specifically, in this case, if the user selects Photoconductor drum from the candidate measures displayed on the reception screen 231 (see FIG. 13), the CPU 11*a* of the server apparatus 200 overlaps the reference diagnostic image 61A with the corrective image and thus generates the predicted image 301 without the specific form of the image defect described above.

Thereafter, the CPU 11*a* of the server apparatus 200 generates the user screen 801 including the measure information and the generated predicted image 301, similarly to the above. The CPU 11*a* of the server apparatus 200 then transmits the user screen 801 to the user terminal 300.

Also in this case, the user screen 801 is thereby displayed on the display 310 of the user terminal 300.

The case where the predicted image 301 is generated by overlapping the images with each other has been described above as an example; the method for generating the predicted image 301 is not limited to the overlapping of the images.

For example, the pixel values of pixels in a part corresponding to the image defect may be replaced with the pixel values of different pixels present around the image defect to generate the predicted image 301 without the image defect or a lower degree of image defect.

Different Example of Reception Screen

Figure 17:
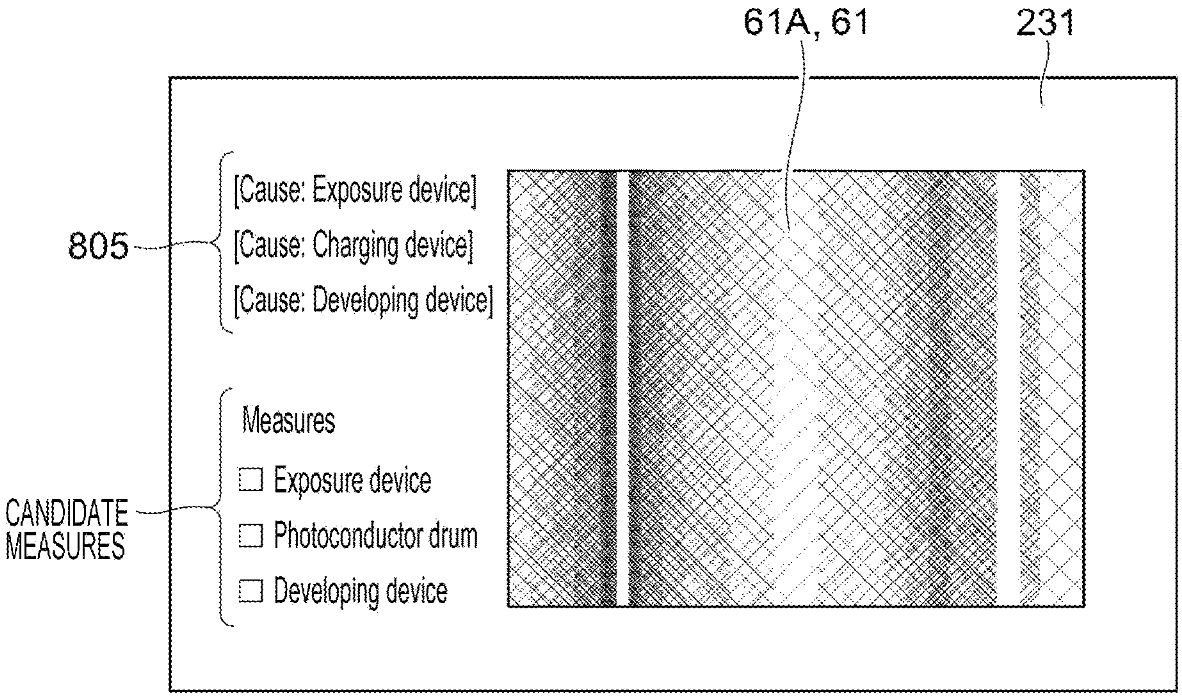
FIG. 17 is a view illustrating a different example of the reception screen generated by the CPU of the server apparatus.

FIG. 17 is a view illustrating a different example of the reception screen 231 generated by the CPU 11*a* of the server apparatus 200.

Similarly to the above, the reference diagnostic image 61A and the candidate measures are displayed on the reception screen 231 illustrated in in FIG. 17.

Further, cause information 805 that is information regarding the causes of the image defect of the reference diagnostic image 61A is displayed on the reception screen 231 illustrated in FIG. 17.

Specifically, in this example, information regarding the device causing the image defect is displayed as the cause information 805.

More specifically, in this example, information indicating that the device causing the image defect is one of Exposure device, Charging device, and Developing device is displayed as the cause information 805.

The screen including the reference diagnostic image 61A and the candidate measures is illustrated as the reception screen 231 in the example illustrated in FIG. 13. However, the reception screen 231 is not limited to this and may be designed to include the cause information 805.

To design the reception screen 231 to display the cause information 805, the CPU 11*a* of the server apparatus 200 generates the exposure-targeted difference image 701, the charging-targeted difference image 702, and the development-exclusive diagnostic image 61C that are illustrated in FIG. 14 before generating the reception screen 231.

The CPU 11*a* of the server apparatus 200 then acquires the cause information 805 on the basis of these generated images.

To design the reception screen 231 to display the cause information 805, the information regarding the causes of the image defect appearing in the reference diagnostic image 61A is acquired.

Before generating the reception screen 231, the CPU 11*a* of the server apparatus 200 generates the exposure-targeted difference image 701, the charging-targeted difference image 702, and the development-exclusive diagnostic image 61C that are illustrated in FIG. 14. The CPU 11*a* of the server apparatus 200 then acquires the cause information 805 on the basis of these generated images.

The CPU 11*a* of the server apparatus 200 analyzes the exposure-targeted difference image 701, the charging-targeted difference image 702, and the development-exclusive diagnostic image 61C and acquires the cause information 805.

If the exposure-targeted difference image 701 is in a predetermined state after the CPU 11*a* analyzes the exposure-targeted difference image 701, the CPU 11*a* decides that the device causing the image defect is the exposure device 102.

Specifically, if a predetermined form of an image defect such as the left-side image defect 96A is present in the exposure-targeted difference image 701, the CPU 11*a* of the server apparatus 200 decides that the device causing the image defect is the exposure device 102.

If the charging-targeted difference image 702 is in the predetermined state after the charging-targeted difference image 702 is analyzed, the CPU 11*a* decides that the device causing the image defect is the charging device 101C.

Specifically, if a predetermined form of an image defect such as the density non-uniformity image defect 96B is present in the charging-targeted difference image 702, the CPU 11*a* decides that the device causing the image defect is the charging device 101C.

If the development-exclusive diagnostic image 61C is in the predetermined state after the development-exclusive diagnostic image 61C is analyzed, the CPU 11*a* decides that the device causing the image defect is the developing device 103.

Specifically, if a predetermined form of an image defect such as the right-side image defect 96C is present in the development-exclusive diagnostic image 61C, the CPU 11*a* decides that the device causing the image defect is the developing device 103.

The CPU 11*a* of the server apparatus 200 generates the reception screen 231 to include the acquired cause information 805 in the reception screen 231.

In other words, in this case, the CPU 11*a* of the server apparatus 200 includes, as the cause information 805, the information regarding the device causing the image defect in the reception screen 231.

The screen illustrated in FIG. 17 is thereby generated.

Pieces of information regarding the device causing the image defect are displayed in a list in FIG. 17; however, the form of displaying the pieces of information regarding the device causing the image defect is not limited to this.

For example, the information regarding the device causing the image defect may be displayed in such a manner that the image defect occurring in the reference diagnostic image 61A is associated with the information regarding the device.

In the case where the image defect is associated with the information regarding the device causing the image defect, the information regarding the device is displayed, for example, in a part where the image defect is present.

Alternatively, an image indicating that the image defect is associated with the information regarding the device may be displayed, for example, a line connecting the image defect and the information regarding the device is displayed.

Different Example of Reception Screen

Figure 18A:
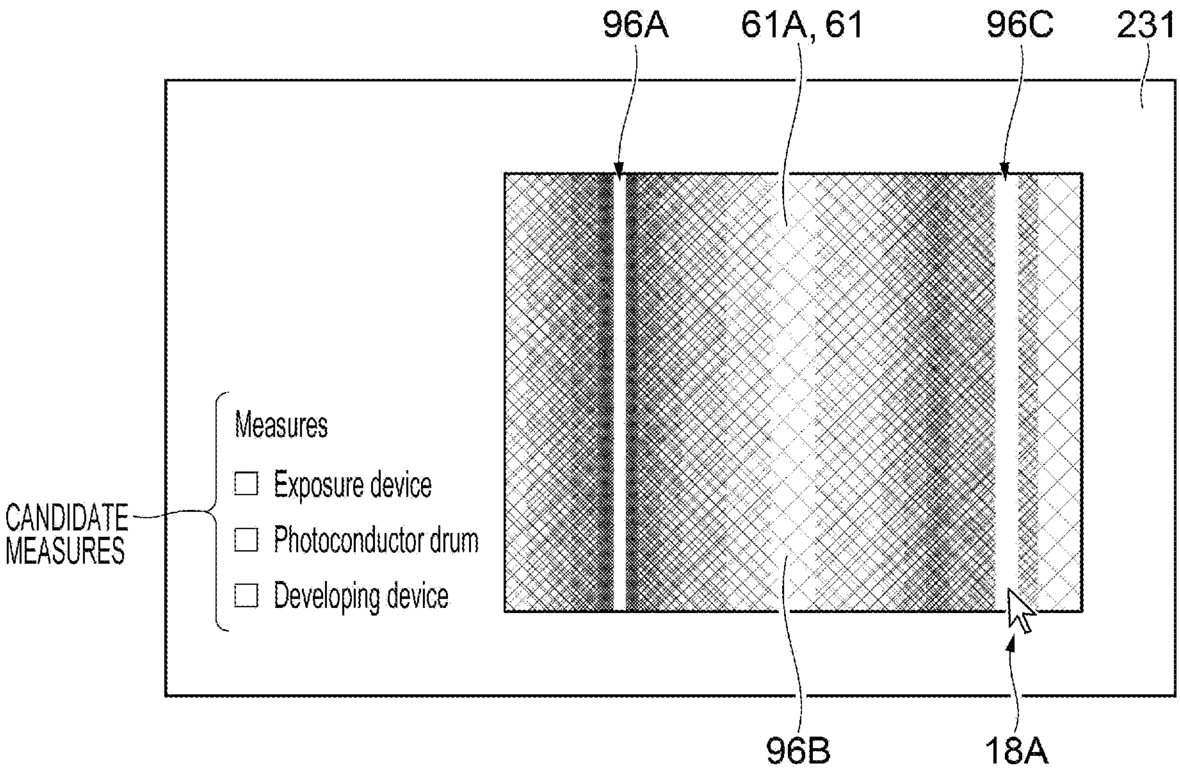
FIGS. 18A and 18B are each a view illustrating a different example of the reception screen displayed on a user terminal.
Figure 18B:
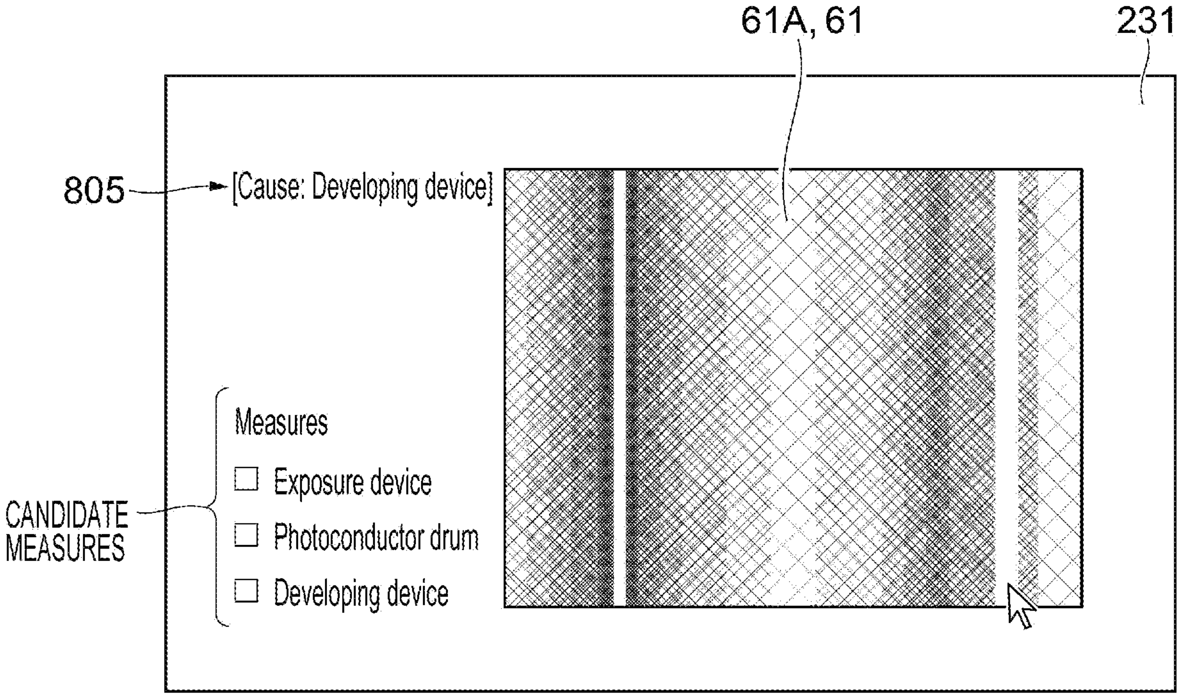

FIGS. 18A and 18B are each a view illustrating a different example of the reception screen 231 displayed on the user terminal 300.

The form in which the cause information 805 is displayed on the reception screen 231 is not limited to the form in which the cause information 805 is displayed on the reception screen 231 from the beginning.

In response to the user selecting a part of the reference diagnostic image 61A displayed on the reception screen 231, the cause information 805 for the part may be displayed.

In the example in FIGS. 18A and 18B, as denoted by reference numeral 18A in FIG. 18A, a case where the user selects the right-side image defect 96C present in the reference diagnostic image 61A is illustrated.

In this case, in the processing example, the cause information 805 is displayed on the reception screen 231 in response to the selection, as illustrated in FIG. 18B.

Specifically, in this processing example, the cause information 805 indicating that the device causing the image defect is the developing device is displayed.

In this processing example, in response to the user selecting an image defect present in the reference diagnostic image 61A displayed on the reception screen 231 by operating the user terminal 300, the selected information for identifying the image defect is transmitted to the server apparatus 200.

In response to this, the CPU 11*a* of the server apparatus 200 decides the image defect selected by the user.

The CPU 11*a* of the server apparatus 200 then generates a new reception screen 231 including the information regarding the device causing the image defect.

The CPU 11*a* of the server apparatus 200 then transmits the new generated reception screen 231 to the user terminal 300.

The cause information 805 relevant to the image defect is thereby displayed on the reception screen 231, as illustrated in FIG. 18B.

If the user selects the reference diagnostic image 61A (see FIG. 18A) having the left-side image defect 96A by operating the user terminal 300 (this is not illustrated), the cause information 805 indicating that the device causing the image defect is the exposure device 102 is displayed on the reception screen 231.

If the user selects the density non-uniformity image defect 96B having the reference diagnostic image 61A by operating the user terminal 300, for example, by specifying the center portion of the reference diagnostic image 61A, the cause information 805 indicating that the device causing the image defect is the charging device 101C is displayed on the reception screen 231.

The cause information 805 displayed on the reception screen 231 is not limited to the cause information 805 acquired on the basis of the exposure-targeted difference image 701, the charging-targeted difference image 702, or the development-exclusive diagnostic image 61C.

The cause information 805 may be acquired on the basis of a specific form of an image defect present in the reference diagnostic image 61A and displayed on the reception screen 231.

Specifically, for example, if the image defect appearing in the reference diagnostic image 61A is an image defect in a specific form considered to be attributed to the charging device 101C as described above, the cause information 805 indicating that the device causing the image defect is the charging device 101C may be displayed on the reception screen 231.

Generation Process for Predicted Image not Based on Measure Information

In the processing example described above, the case where the predicted image 301 is generated after the user specifies a measure has been described as an example.

In other words, in the processing example described above, after the user specifies a measure, a corrective image to be overlapped with the reference diagnostic image 61A is decided on the basis of the measure information that is the information regarding the specified measure.

The predicted image 301 is then generated by overlapping the decided corrective image with the reference diagnostic image 61A.

The form of generating the predicted image 301 is not limited to this, and the predicted image 301 may be generated without using the measure information. More specifically, for example, the predicted image 301 may be generated for each of all of the measures possibly implemented by the user.

In the processing example described with reference to FIGS. 3 to 9, the predicted image 301 may also be generated without using the measure information. In the processing example described with reference to FIGS. 3 to 9, the predicted image 301 is generated on the basis of the measure information; however, also in the processing example described with reference to FIGS. 3 to 9, the predicted image 301 may be generated for each of all of the measures possibly implemented by the user.

Note that in the processing examples described with reference to FIG. 10 and the subsequent figures, there are the following eight measures as the measures possibly implemented by the user. The eight predicted images 301 may each be generated for each of the eight measures.

Eight Measures:

- No measure is implemented.
- Only the exposure device 102 is replaced.
- Only the photoconductor drum 101 and the charging device 101C are replaced.
- Only the developing device 103 is replaced.
- The exposure device 102, the photoconductor drum 101, and the charging device 101C are replaced.
- The exposure device 102 and the developing device 103 are replaced.
- The photoconductor drum 101, the charging device 101C, and the developing device 103 are replaced.
- The exposure device 102, the photoconductor drum 101, the charging device 101C, and the developing device 103 are replaced.

In generating the eight predicted images 301, the eight predicted images 301 thus generated are stored in the secondary storage 12 (see FIG. 2) of the server apparatus 200.

After measure information that is information regarding the measure selected by the user is transmitted from the user terminal 300, the server apparatus 200 decides and acquires a predicted image 301 for the measure information from among the eight predicted images 301 described above.

Similarly to the above, the CPU 11*a* of the server apparatus 200 then generates the user screen 801 (see FIGS. 16A to 16C) including the information regarding the candidate measures and the acquired predicted image 301.

The processing performed in the case where the predicted image 301 is generated after the reception screen 231 is generated has been described above as an example; however, timing for generating the predicted image 301 is not limited to this.

The predicted image 301 may be generated before the reception screen 231 is generated.

In the case where the read image data is transmitted from the user terminal 300 to the server apparatus 200, the CPU 11*a* of the server apparatus 200 may first generate the predicted image 301 and then the reception screen 231.

If the predicted image 301 is generated before the reception screen 231 is generated, the predicted image 301 is generated in a state where the measure information has not been acquired.

In this case, for example, as described above, the predicted images 301 are respectively generated for all of the measures of the eight measures, thus the eight predicted images 301 being generated.

Note that the nonexposure diagnostic image 61B (see (B) in FIG. 14) may be regarded as a first nonoperation image that is an image formed by the image forming apparatus 100 in a state where one or more of multiple devices included in the image forming apparatus 100 are nonoperational.

The reference diagnostic image 61A (see (A) in FIG. 14) may also be regarded as a second nonoperation image that is an image formed by the image forming apparatus 100 in a state where a device the count of which is lower than that of the one or more nonoperational devices is nonoperational.

More specifically, the nonexposure diagnostic image 61B may be regarded as the first nonoperation image that is an image formed by the image forming apparatus 100 in the state where the exposure device 102 serving as an example of one of multiple devices included in the image forming apparatus 100 is nonoperational.

The reference diagnostic image 61A may also be regarded as the second nonoperation image that is an image formed by the image forming apparatus 100 in a state where a device the count of which is lower than that of the exposure device 102 that is the one nonoperational device is nonoperational.

The term "lower count" described above includes zero.

The reference diagnostic image 61A may be regarded as the second nonoperation image that is an image formed by the image forming apparatus 100 in a state zero devices the count of which is lower than that of the exposure device 102 that is the one nonoperational device described above are nonoperational.

In this exemplary embodiment, the predicted image 301 is generated on the basis of the first nonoperation image and the second nonoperation image.

More specifically, in this exemplary embodiment, the difference information that is information regarding a difference between the first nonoperation image and the second nonoperation image is acquired.

Specifically, in this exemplary embodiment, the exposure-targeted difference image 701 described above is acquired as an example of the difference information. The exposure-targeted difference image 701 includes information regarding the difference between the first nonoperation image and the second nonoperation image.

In this exemplary embodiment, the predicted image 301 (not illustrated in FIG. 14) is then generated on the basis of the exposure-targeted difference image 701 and the reference diagnostic image 61A (see (A) in FIG. 14) that respectively serve as an example of the difference information and an example of an image formed by the image forming apparatus 100 in the state the multiple devices in the image forming apparatus 100 are operational.

In other words, in this exemplary embodiment, the predicted image 301 is generated on the basis of the reference diagnostic image 61A serving as an example of an image formed by the image forming apparatus 100 in a state where all of the exposure-targeted difference image 701, the charging device 101C, the exposure device 102, and the developing device 103 are operational.

More specifically, in this exemplary embodiment, the predicted image 301 is generated on the basis of a component obtained by subtracting, from the components of the reference diagnostic image 61A, image components decided from the exposure-targeted difference image 701 serving as the example of the difference information.

In this exemplary embodiment, as described above, an overlapping process is performed in which the reference diagnostic image 61A is overlapped with the exposure-targeted corrective image 501 obtained on the basis of the exposure-targeted difference image 701.

It may be said that a process for subtracting image components decided from the exposure-targeted difference image 701 from the components of the reference diagnostic image 61A is executed as the overlapping process.

In addition, in this exemplary embodiment, the development-exclusive diagnostic image 61C (see (C) in FIG. 14) may be regarded as the second nonoperation image that is an image formed by the image forming apparatus 100 in a state where a device the count of which is greater than that of the one or more nonoperational devices is nonoperational.

In this exemplary embodiment, the nonexposure diagnostic image 61B (see (B) in FIG. 14) may be regarded as the first nonoperation image that is an image formed by the image forming apparatus 100 in the state where one or more devices are nonoperational.

Further, in this exemplary embodiment, the development-exclusive diagnostic image 61C may be regarded as the second nonoperation image formed by the image forming apparatus 100 in the state where a device the count of which is greater than that of the one or more devices is nonoperational.

In this exemplary embodiment, the nonexposure diagnostic image 61B may be regarded as the first nonoperation image that is an image formed by the image forming apparatus 100 in the state where the exposure device 102 that is one of the multiple devices included in the image forming apparatus 100 is nonoperational.

In addition, in this exemplary embodiment, the development-exclusive diagnostic image 61C may also be regarded as the second nonoperation image that is an image formed by the image forming apparatus 100 in a state where two devices that are the charging device 101C and the exposure device 102 the count of which is greater than that of the exposure device 102 that is the one nonoperational device are nonoperational.

In this exemplary embodiment, the predicted image 301 is generated on the basis of the first nonoperation image and the second nonoperation image.

More specifically, in this exemplary embodiment, the predicted image 301 is generated on the basis of the charging-targeted difference image 702 and the reference diagnostic image 61A, the charging-targeted difference image 702 serving as the example of the difference information that is the information regarding the difference between the first nonoperation image and the second nonoperation image, the reference diagnostic image 61A being an image formed by the image forming apparatus 100 in the state where the multiple devices in the image forming apparatus 100 are operational.

More specifically, in this exemplary embodiment, the predicted image 301 is generated on the basis of the charging-targeted difference image 702 serving as the example of the difference information and the reference diagnostic image 61A that is an image formed by the image forming apparatus 100 in the state where all of the charging device 101C, the exposure device 102, and the developing device 103 that are provided in the image forming apparatus 100 are operational.

More specifically, in this exemplary embodiment, the predicted image 301 is generated on the basis of a component obtained by subtracting, from the components of the reference diagnostic image 61A, the components of the charging-targeted difference image 702 serving as the example of the difference information.

In this exemplary embodiment, as described above, an overlapping process is executed in which the reference diagnostic image 61A is overlapped with the charging-targeted corrective image 502 acquired on the basis of the charging-targeted difference image 702. It may be said that a process for subtracting image components decided from the charging-targeted difference image 702 from the components of the reference diagnostic image 61A is executed as the overlapping process.

In this exemplary embodiment, a difference between the count of the operational devices in acquiring the first nonoperation image and the count of the operational devices in acquiring the second nonoperation image is one.

The difference is not limited to this, and the difference between the count of the operational devices in acquiring the first nonoperation image and the count of the operational devices in acquiring the second nonoperation image may be two or more.

Setting the difference as two or more leads to less easier narrowing down of the device causing the image defect than that in the case where the difference is one; however, even the difference of two or more leads to easier decision of the device causing the image defect than that in a configuration in which the process in this exemplary embodiment is not executed at all.

Further, in this exemplary embodiment, the predicted image 301 is generated on the basis of the following images formed by the image forming apparatus 100. One of the images is formed in a state where the charging device 101C and the exposure device 102 are nonoperational and only the developing device 103 is operational. The other image is formed in the state where all of the charging device 101C, the exposure device 102, and the developing device 103 are operational.

In this exemplary embodiment, the development-exclusive diagnostic image 61C described above is acquired as the image formed by the image forming apparatus 100 in the state where the charging device 101C and the exposure device 102 are nonoperational and only the developing device 103 is operational.

Further, in this exemplary embodiment, the reference diagnostic image 61A described above is acquired as the image formed by the image forming apparatus 100 in the state where all of the charging device 101C, the exposure device 102, and the developing device 103 are operational.

In this exemplary embodiment, the predicted image 301 is generated also on the basis of the development-exclusive diagnostic image 61C and the reference diagnostic image 61A.

The predicted image 301 is generated on the basis of a component obtained by subtracting, from the components of the reference diagnostic image 61A, the components of the development-exclusive diagnostic image 61C.

In this exemplary embodiment, as described above, an overlapping process in which the reference diagnostic image 61A is overlapped with the development-targeted corrective image 503 acquired on the basis of the development-exclusive diagnostic image 61C is executed.

It may be said that a process for subtracting image components decided from the development-exclusive diagnostic image 61C from the components of the reference diagnostic image 61A is executed as the overlapping process.

Further, in this exemplary embodiment, the cause information 805 described above included in the reception screen 231 (see FIGS. 17 and 18) is also acquired on the basis of a nonoperation image.

In this exemplary embodiment, as described above, the reception screen 231 used to receive the specification of a measure by the user is generated.

As illustrated in FIGS. 17, 18A, and 18B, the generated reception screen 231 includes the reference diagnostic image 61A serving as the example of an image formed by the image forming apparatus 100 and the cause information 805 that is the information regarding the causes of the image defect of the reference diagnostic image 61A.

In this exemplary embodiment, the cause information 805 is also acquired on the basis of a nonoperation image.

Specifically, the cause information 805 is also acquired on the basis of the first nonoperation image and the second nonoperation image, the first nonoperation image being the image formed by the image forming apparatus 100 in the state where one or more of the multiple devices included in the image forming apparatus 100 are nonoperational, the second nonoperation image being the image formed by the image forming apparatus 100 in the state where the device the count of which is greater than or lower than that of the one or more nonoperational devices is nonoperational.

As described above, the nonexposure diagnostic image 61B (see (B) in FIG. 14) is taken as an example of the first nonoperation image, and the reference diagnostic image 61A (see (A) in FIG. 14) is taken as an example of the second nonoperation image.

In this exemplary embodiment, the cause information 805 is acquired on the basis of the exposure-targeted difference image 701 being acquired on the basis of the reference diagnostic image 61A and the nonexposure diagnostic image 61B, the reference diagnostic image 61A serving as the example of the second nonoperation image, the nonexposure diagnostic image 61B serving as the example of the first nonoperation image.

In addition, the nonexposure diagnostic image 61B is taken as an example of the first nonoperation image, and the development-exclusive diagnostic image 61C (see (C) in FIG. 14) is taken as an example of the second nonoperation image.

In this exemplary embodiment, the cause information 805 is acquired on the basis of the charging-targeted difference image 702 described above acquired on the basis of the nonexposure diagnostic image 61B serving as the example of the first nonoperation image and the development-exclusive diagnostic image 61C serving as the example of the second nonoperation image.

In this exemplary embodiment, as described above, the cause information 805 is acquired also on the basis of the development-exclusive diagnostic image 61C.

Specifically, in this exemplary embodiment, the cause information 805 is acquired also on the basis of the development-exclusive diagnostic image 61C formed by the image forming apparatus 100 in the state where the charging device 101C and the exposure device 102 are nonoperational and the developing device 103 is operational.

Predicted Image for Case of Exchanging Some Devices Between Image Forming Units

The predicted image 301 for a case where some devices are exchanged between the image forming units 98 will then be described.

The case where the predicted image 301 is generated in replacing a device with a new device has been described above as an example.

The case for generating the predicted image 301 is not limited to this. The predicted image 301 under the assumption of exchanging a device included in one of the image forming units 98 and a device included in a different one of the image forming units 98 may be generated.

More specifically, in generating the predicted image 301 for the image forming unit 98, the predicted image 301 predicted for a case where a device provided in the different image forming unit 98 is mounted on the image forming unit 98 may be generated.

In generating the predicted image 301 for the different image forming unit 98, the predicted image 301 predicted for a case where the device provided in the image forming unit 98 is mounted on the different image forming unit 98 may also be generated.

A generation process for the predicted image 301 under the following assumption will herein be described as an example: a device included in one of the image forming units 98 for magenta and a device included in one of the image forming units for yellow are exchanged.

More specifically, a generation process for the predicted image 301 under the following assumption will be described: a device included in the image forming unit 98 for magenta denoted by the reference numeral 10M in FIG. 10 and a device included in the image forming unit 98 for yellow denoted by the reference numeral 10Y in FIG. 10 are exchanged.

More specifically, for example, a case where an image formed by the image forming unit 98 for magenta has a low quality is herein assumed.

Further, the following case is herein assumed: the quality of the image formed by the image forming unit 98 for magenta is improved by exchanging the device included in the image forming unit 98 for magenta and the device included in the image forming unit 98 for yellow.

Further, a case where an image defect has occurred in the image formed by the magenta image forming unit 98 due to the charging device 101C included in the magenta image forming unit 98 is herein assumed.

A case where the quality of the image formed by the image forming unit 98 for magenta is improved by exchanging the charging device 101C included in the magenta image forming unit 98 and the charging device 101C included in the image forming unit 98 for yellow is herein assumed.

When the charging devices 101C are exchanged, the corresponding photoconductor drums 101 are also exchanged, as described above.

If the image formed by the image forming unit 98 for magenta has a low quality due to the charging device 101C included in the magenta image forming unit 98, exchanging the charging devices 101C for magenta and yellow causes quality deterioration in a yellow image.

However, the yellow image is less conspicuous. Even though the quality of the yellow image is deteriorated, the image quality deterioration is less conspicuous.

If the charging device 101C included in the image forming unit 98 for magenta and the charging device 101C included in the image forming unit 98 for yellow are exchanged, it appears that the quality of an image formed on the paper sheet P has been improved as a whole.

Under the circumstances above, the predicted image 301 for the image forming unit 98 for magenta is generated on the basis of the reference diagnostic image 61A for magenta (see (A) in FIG. 14), the charging-targeted corrective image 502 for magenta, and the charging-targeted difference image 702 for yellow.

Specifically, the predicted image 301 for magenta is generated by overlapping the reference diagnostic image 61A for magenta, the charging-targeted corrective image 502 for magenta, and the charging-targeted difference image 702 for yellow with each other.

If the reference diagnostic image 61A for magenta is overlapped with the charging-targeted corrective image 502 for magenta, an image defect such as the density non-uniformity image defect 96B described above attributed to the charging device 101C for magenta disappears from the reference diagnostic image 61A for magenta.

Further, in this processing example, the charging-targeted difference image 702 for yellow is further overlapped with the reference diagnostic image 61A.

In this case, the state of the charging device 101C for yellow is thereby reflected on the predicted image 301 for magenta thus generated.

In this case, even if the charging device 101C provided in the image forming unit 98 for yellow is not mounted actually on the image forming unit 98 for magenta, the predicted image 301 for the image forming unit 98 for magenta is acquired.

More specifically, the predicted image 301 that is the predicted image 301 for the image forming unit 98 for magenta and that is predicted for the case where the charging device 101C provided in the image forming unit 98 for yellow is mounted on the image forming unit 98 for magenta.

The predicted image 301 for the image forming unit 98 for yellow is generated on the basis of the reference diagnostic image 61A (see (A) in FIG. 14 for yellow), the charging-targeted corrective image 502 for yellow, and the charging-targeted difference image 702 for magenta.

Specifically, the predicted image 301 for yellow is generated by overlapping the reference diagnostic image 61A for yellow, the charging-targeted corrective image 502 for yellow, and the charging-targeted difference image 702 for magenta with each other.

In addition, for example, a case where the developing device 103 included in the image forming unit 98 for magenta and the developing device 103 included in the image forming unit 98 for yellow are exchanged is also assumed.

In this case, the predicted image 301 for magenta may be generated on the basis of the reference diagnostic image 61A for magenta, the development-targeted corrective image 503 for magenta, and the development-exclusive diagnostic image 61C for yellow.

In this case, the predicted image 301 for yellow may also be generated on the basis of the reference diagnostic image 61A for yellow, the development-targeted corrective image 503 for yellow, and the development-exclusive diagnostic image 61C for magenta.

In addition, for example, a case where the exposure device 102 included in the image forming unit 98 for magenta and the exposure device 102 included in the image forming unit 98 for yellow are exchanged is also assumed.

In this case, the predicted image 301 for magenta may be generated on the basis of the reference diagnostic image 61A for magenta, the exposure-targeted corrective image 501 for magenta, and the exposure-targeted difference image 701 for yellow.

In this case, the predicted image 301 for yellow may also be generated on the basis of the reference diagnostic image 61A for yellow, the exposure-targeted corrective image 501 for yellow, and the exposure-targeted difference image 701 for magenta.

As described above, the image forming apparatus 100 of this exemplary embodiment is provided with the multiple image forming units 98 that each form the image and that each include the multiple devices.

In this exemplary embodiment, as described above, in generating the predicted image 301 for an image to be formed by the image forming unit 98 in response to a measure decided in accordance with the measure information indicating exchange between one of the devices included in one of the image forming units 98 and one of the devices included in a different one of the image forming units 98, first difference information and second difference information are acquired.

Specifically, in this exemplary embodiment, information regarding a difference between images is acquired as the first difference information. One of the images is formed by one of the image forming units 98 in a state where an exchange target device among the multiple devices included in the image forming unit 98 is operational. The other image is formed by the image forming unit 98 in a state where the exchange target device is nonoperational.

In this exemplary embodiment, information regarding a difference between images is acquired as the second difference information. One of the images is formed by a different one of the image forming units 98 in a state where an exchange target device among the multiple devices included in the different image forming unit 98 is operational. The other image is formed by the different image forming unit 98 in a state where the exchange target device is nonoperational.

A specific description is provided by taking the example described above where the charging devices 101C respectively for magenta and yellow are exchanged.

In this exemplary embodiment, information regarding a difference between images is acquired as the first difference information. One of the images is formed by the image forming unit 98 for magenta in the state where the charging device 101C of the multiple devices included in the image forming unit 98 for magenta is operational, and the other image is formed by the image forming unit 98 for magenta in the state where the charging device 101C is nonoperational.

More specifically, in this exemplary embodiment, the charging-targeted difference image 702 (see FIG. 14) for magenta is acquired as the first difference information.

In this exemplary embodiment, information regarding a difference between images is acquired as the second difference information. One of the images is formed by the image forming unit 98 for yellow in the state where the charging device 101C of multiple devices included in the image forming unit 98 for yellow is operational, and the other information is formed by the image forming unit 98 for yellow in the state where the charging device 101C is nonoperational.

More specifically, in this exemplary embodiment, the charging-targeted difference image 702 for yellow is acquired as the second difference information.

In this exemplary embodiment, the predicted image 301 for an image to be formed by one of the image forming units 98 for magenta is generated on the basis of an image formed by the image forming unit 98 in the state where the multiple devices included in the image forming unit 98 are operational, the first difference information, and the second difference information.

More specifically, the predicted image 301 for the image to be formed by the image forming unit 98 for magenta is generated on the basis of the reference diagnostic image 61A, the first difference information, and the second difference information, the reference diagnostic image 61A being an image formed by the image forming unit 98 for magenta in a state where the charging device 101C, the exposure device 102, and the developing device 103 that are the multiple devices included in the image forming unit 98 for magenta are operational.

More specifically, the predicted image 301 for magenta is generated on the basis of components obtained by executing the following process. Image components that are subjected to the subtraction of image components decided from the first difference information and that are decided from the second difference information are added to the components of the reference diagnostic image 61A that is an image formed by the image forming unit 98 for magenta in the state where the charging device 101C, the exposure device 102, and the developing device 103 that are the multiple devices are operational.

More specifically, the predicted image 301 for magenta is generated on the basis of components obtained by executing the following process. Image components decided from the charging-targeted difference image 702 for magenta are subtracted from the components of the reference diagnostic image 61A formed by the image forming unit 98 for magenta, and image components decided from the charging-targeted difference image 702 for yellow are added to the image components decided from the charging-targeted difference image 702 for magenta.

In this exemplary embodiment, in generating the predicted image 301 that is the predicted image 301 for the image forming unit 98 for magenta and predicted for the case where the charging devices 101C serving as examples of the some devices are exchanged, a process for overlapping the reference diagnostic image 61A for magenta with the charging-targeted corrective image 502 for magenta is performed.

It may be said that a process for subtracting the image components decided from the charging-targeted difference image 702 for magenta serving as an example of the first difference information from the components of the reference diagnostic image 61A formed by the image forming unit 98 for magenta is executed as this process.

In this exemplary embodiment, in generating the predicted image 301 that is the predicted image 301 for the image forming unit 98 for magenta and predicted for the case where the charging devices 101C serving as examples of the some devices are exchanged, a process for overlapping the reference diagnostic image 61A for magenta with the charging-targeted difference image 702 for yellow is executed.

It may be said that a process for adding the image components decided from the charging-targeted difference image 702 for yellow serving as an example of the second difference information to the components of the reference diagnostic image 61A formed by the image forming unit 98 for magenta is executed as this process.

In the process described above, the predicted image 301 for the image forming unit 98 for magenta that serves as an example of one of the image forming units 98 and that is predicted for the case where the some devices are exchanged is acquired.

Candidate Measure Reporting Process

In addition, in presenting information regarding candidate measures to the user, only candidate measures satisfying a condition registered in advance by the user may be presented without presenting all of candidate measures.

In this exemplary embodiment, as illustrated in FIG. 13, the candidate measures are displayed on the reception screen 231, and the candidate measures are presented to the user by using the reception screen 231.

The candidate measures displayed on the reception screen 231 may be decided on the basis of the condition registered in advance by the user.

To present only the candidate measures satisfying the condition registered in advance by the user, the user registers in advance for each device information regarding cost taken for device replacement, required time taken for device replacement, the level of difficulty in device replacement, or the like, by using, for example, the user terminal 300.

In generating the reception screen 231, the CPU 11*a* of the server apparatus 200 selects a candidate measure from multiple candidate measures on the basis of the information registered by the user to include the selected candidate measure in the reception screen 231.

Further description is provided by taking a specific example. The user registers, as intended conditions, information regarding, for example, maximum allowable time that is time allowable as time for a measure or maximum allowable cost that is cost allowable as cost for a measure.

In this case, in generating the reception screen 231, the CPU 11*a* of the server apparatus 200 decides a device involving with the time taken for the measure is within the maximum allowable time or a device involving with the cost taken for the measure within the maximum allowable cost. The CPU 11*a* of the server apparatus 200 includes the decided device as a candidate measure in the reception screen 231.

In this case, the reception screen 231 used to receive the specification of a measure by the user and including a candidate measure satisfying the condition input by is generated.

In this exemplary embodiment, the candidate measures are displayed also on the screen 201 illustrated in FIG. 4, and the screen 201 may also be generated to include only the candidate measures satisfying the condition registered in advance by the user.

In addition, on the screen for displaying the candidate measures, such as the screen 201 illustrated in FIG. 4 above or the reception screen 231 illustrated in FIG. 13 above, information regarding required time as time required for a measure, the cost taken for a measure, or the like may be displayed for each candidate measure.

In other words, on the screen for displaying the candidate measures, the information regarding required time as time required for a measure, the cost taken for a measure, or the like may be displayed in such a manner as to correspond to each of the candidate measures.

In addition, similarly to the display example illustrated in FIG. 4, the reception screen 231 illustrated in FIG. 13 may be designed to include evaluation information regarding the reference diagnostic image 61A.

In this case, before generating the reception screen 231, the CPU 11*a* of the server apparatus 200 diagnoses the reference diagnostic image 61A and acquires the diagnosis results of the multiple diagnosis items. The CPU 11*a* of the server apparatus 200 then acquires the evaluation information on the basis of the acquired diagnosis results.

The CPU 11*a* of the server apparatus 200 then generates the reception screen 231 including the evaluation information to include the evaluation information in the reception screen 231.

In addition, in generating the user screen 801 including the predicted image 301 illustrated in each of FIGS. 16A to 16C, similarly to the display example illustrated in FIG. 5, the user screen 801 may be designed to include the evaluation information regarding the predicted image 301.

To include the evaluation information regarding the predicted image 301 in the user screen 801, the CPU 11*a* of the server apparatus 200 diagnoses the predicted image 301 and acquires the diagnosis results of the multiple diagnosis items. The CPU 11*a* of the server apparatus 200 then generates the evaluation information regarding the predicted image 301 on the basis of the acquired diagnosis results.

The CPU 11*a* of the server apparatus 200 then generates the user screen 801 including the evaluation information regarding the predicted image 301 to include the evaluation information in the user screen 801.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Appendix (((1)))

An information processing system includes:

a processor configured to:

acquire measure information serving as information regarding a measure that is allowed to be implemented on an image forming apparatus and that is specified by a user, the image forming apparatus forming an image on a recording medium; and generate a predicted image serving as an image predicted to be acquired in response to the image forming apparatus forming an image after the measure decided in accordance with the measure information is implemented.

(((2)))

In the information processing system according to (((1))), the processor is configured to:

acquire a read image acquired by reading an image actually formed by the image forming apparatus before the user specifies the measure; and generate the predicted image on a basis of the read image and the measure information.

(((3)))

In the information processing system according to (((2))), the processor is configured to:

make a change to at least part of the read image on a basis of the measure information and generate the predicted image corresponding to the read image having undergone the change.

(((4)))

In the information processing system according to (((2))), the processor is configured to:

make a change to at least part of analysis information on a basis of the measure information and generate the predicted image on a basis of the analysis information having undergone the change, the analysis information serving as information acquired by analyzing the read image.

(((5)))

In the information processing system according to (((1))), the user specifies the measure by selecting a candidate measure presented to the user, and the processor is configured to:

decide a candidate measure to be presented to the user on a basis of the image actually formed by the image forming apparatus.

(((6)))

In the information processing system according to (((1))), the processor is configured to:

evaluate the generated predicted image and generate evaluation information regarding the generated predicted image.

(((7)))

In the information processing system according to (((6))), the processor is configured to:

generate a screen including the predicted image and the evaluation information.

(((8)))

An information processing system includes:

a processor configured to:

acquire measure information that is information regarding a measure allowed to be implemented for an image forming apparatus that forms an image on a recording medium; and generate a predicted image that is an image predicted to be acquired in response to the image forming apparatus forming an image after a measure decided in accordance with the measure information is implemented.

(((9)))

In the information processing system according to (((8))), the processor is configured to:

acquire, as the measure information, measure information that is information regarding a measure that is allowed to be implemented by a user for the image forming apparatus and that is specified by the user; and generate, as the predicted image, an image predicted to be acquired in response to the image forming apparatus forming an image after the measure decided in accordance with the measure information is implemented, the measure information being the information regarding the measure specified by the user.

(((10)))

In the information processing system according to (((8))), the processor is configured to:

generate the predicted image on a basis of a first nonoperation image and a second nonoperation image, the first nonoperation image being an image formed by the image forming apparatus in a state where one or more devices of multiple devices included in the image forming apparatus are nonoperational, the second nonoperation image being an image formed by the image forming apparatus in a state where a device a count of which is greater than or lower than a count of the one or more nonoperational devices is nonoperational.

(((11)))

In the information processing system according to (((10))), the processor is configured to:

form the predicted image on a basis of difference information and an image formed by the image forming apparatus in a state where the multiple devices included in the image forming apparatus are operational, the difference information being information regarding a difference between the first nonoperation image and the second nonoperation image.

(((12)))

In the information processing system according to (((11))), the processor is configured to:

generate the predicted image on a basis of a component obtained by subtracting an image component decided from the difference information from a component of the image formed by the image forming apparatus in the state where the multiple devices included in the image forming apparatus are operational.

(((13)))

In the information processing system according to (((8))), the image forming apparatus is provided with a charging device that charges an image holder, an exposure device that performs light exposure on the image holder charged by the charging device, and a developing device that adheres a developer to the image holder having undergone the light exposure by the exposure device, and the processor is configured to:

generate the predicted image on a basis of an image formed by the image forming apparatus in a state where the charging device and the exposure device are nonoperational and the developing device is operational and on a basis of an image formed by the image forming apparatus in a state where the charging device, the exposure device, and the developing device are operational.

(((14)))

In the information processing system according to (((13))), the processor is configured to:

generate the predicted image on a basis of a component obtained by subtracting a component of the image formed by the image forming apparatus in the state where the charging device and the exposure device are nonoperational and the developing device is operational from a component of the image formed by the image forming apparatus in the state where the charging device, the exposure device, and the developing device are operational.

(((15)))

In the information processing system according to (((9))), the processor is configured to:

generate a reception screen used to receive specification of a measure by the user, the reception screen including an image formed by the image forming apparatus and cause information that is information regarding a cause of an image defect of the image formed by the image forming apparatus.

(((16)))

In the information processing system according to (((15))), the processor is configured to:

acquire the cause information on a basis of a first nonoperation image and a second nonoperation image, the first nonoperation image being an image formed by the image forming apparatus in a state where one or more devices of multiple devices included in the image forming apparatus are nonoperational, the second nonoperation image being an image formed by the image forming apparatus in a state where a device a count of which is greater than or lower than a count of the one or more nonoperational devices is nonoperational.

(((17)))

In the information processing system according to (((15))), the image forming apparatus is provided with a charging device that charges an image holder, an exposure device that performs light exposure on the image holder charged by the charging device, and a developing device that adheres a developer to the image holder having undergone the light exposure by the exposure device, and the processor is configured to:

acquire the cause information on a basis of an image formed by the image forming apparatus in a state where the charging device and the exposure device are nonoperational and the developing device is operational.

(((18)))

In the information processing system according to (((8))), the image forming apparatus is provided with multiple image forming units that each form an image and include multiple devices, and the processor is configured to:

in generating the predicted image for an image to be formed by an image forming unit of the image forming units in response to the measure decided in accordance with the measure information indicating exchange between a device of the devices included in the image forming unit and a device of the devices included in a different image forming unit of the image forming units, acquire first difference information that is information regarding a difference between an image formed by the image forming unit in a state where the device serving as an exchange target device of the multiple devices included in the image forming unit is operational and an image formed by the image forming unit in a state where the device serving as the exchange target device is nonoperational and second difference information that is information regarding a difference between an image formed by the different image forming unit in a state where the device serving as an exchange target device of the multiple devices included in the different image forming unit is operational and an image formed by the different image forming unit in a state where the device serving as the exchange target device is nonoperational; and generate the predicted image for the image to be formed by the image forming unit, on a basis of an image formed by the image forming unit in a state where the multiple devices included in the image forming unit are operational, the first difference information, and the second difference information.

(((19)))

In the information processing system according to (((18))), the processor is configured to:

generate the predicted image on a basis of a component obtained by executing a process for subtracting an image component decided from the first difference information from a component of the image formed by the image forming unit in the state where the multiple devices included in the image forming unit are operational and a process for adding an image component decided from the second difference information to the component of the image formed by the image forming unit in the state where the multiple devices included in the image forming unit are operational.

(((20)))

In the information processing system according to (((9))), the processor is configured to:

generate a reception screen used to receive specification of a measure by the user, the reception screen including a candidate measure that satisfies a condition input by the user.

(((21)))

A program causes a computer to execute a process including:

acquiring measure information serving as information regarding a measure that is allowed to be implemented on an image forming apparatus and that is specified by a user, the image forming apparatus forming an image on a recording medium; and generating a predicted image serving as an image predicted to be acquired in response to the image forming apparatus forming an image after the measure decided in accordance with the measure information is implemented.

(((22)))

A program causes a computer to execute a process including:

acquiring measure information serving as information regarding a measure allowed to be implemented on an image forming apparatus that forms an image on a recording medium; and generating a predicted image serving as an image predicted to be acquired in response to the image forming apparatus forming an image after the measure decided in accordance with the measure information is implemented.

What is claimed is:

1. An information processing system comprising:

a processor configured to:

acquire a read image acquired by reading an image on a recording medium formed by an image forming apparatus;

analyze the image included in the read image and acquire a diagnostic result;

acquire measure information serving as information regarding a measure that is allowed to be implemented on the image forming apparatus and read out a measure associated with the diagnosis result, the measure information including information regarding at least one of piece replacement or image correction processing;

decide one or more candidate measures to be presented to a user based on the image on the recording medium formed by the image forming apparatus;

generate a screen including the image, the diagnosis result and the one or more candidate measures; and generate a predicted image serving as an image predicted to be acquired in response to the image forming apparatus forming an image after the one or more candidate decided in accordance with the measure information is selected by the user and implemented based on the read image and the measure information.

2. The information processing system according to claim 1, wherein the processor is configured to:

make a change to at least part of the read image on a basis of the measure information and generate the predicted image corresponding to the read image having undergone the change.

3. The information processing system according to claim 1, wherein the processor is configured to:

make a change to at least part of analysis information on a basis of the measure information and generate the predicted image on a basis of the analysis information having undergone the change, the analysis information serving as information acquired by analyzing the read image.

4. The information processing system according to claim 1, wherein the processor is configured to:

evaluate the generated predicted image and generate evaluation information regarding the generated predicted image.

5. The information processing system according to claim 4, wherein the processor is configured to:

generate a screen including the predicted image and the evaluation information.

6. The information processing system according to claim 1, wherein the processor is configured to:

acquire, as the measure information, measure information that is information regarding a measure that is allowed to be implemented by a user for the image forming apparatus and that is specified by the user; and generate, as the predicted image, an image predicted to be acquired in response to the image forming apparatus forming an image after the measure decided in accordance with the measure information is implemented, the measure information being the information regarding the measure specified by the user.

7. The information processing system according to claim 1, wherein the processor is configured to:

generate the predicted image on a basis of a first nonoperation image and a second nonoperation image, the first nonoperation image being an image formed by the image forming apparatus in a state where one or more devices of a plurality of devices included in the image forming apparatus are nonoperational, the second nonoperation image being an image formed by the image forming apparatus in a state where a device a count of which is greater than or lower than a count of the one or more nonoperational devices is nonoperational.

8. The information processing system according to claim 7, wherein the processor is configured to:

form the predicted image on a basis of difference information and an image formed by the image forming apparatus in a state where the plurality of devices included in the image forming apparatus are operational, the difference information being information regarding a difference between the first nonoperation image and the second nonoperation image.

9. The information processing system according to claim 8, wherein the processor is configured to:

generate the predicted image on a basis of a component obtained by subtracting an image component decided from the difference information from a component of the image formed by the image forming apparatus in the state where the plurality of devices included in the image forming apparatus are operational.

10. The information processing system according to claim 1, wherein the image forming apparatus is provided with a charging device that charges an image holder, an exposure device that performs light exposure on the image holder charged by the charging device, and a developing device that adheres a developer to the image holder having undergone the light exposure by the exposure device, and wherein the processor is configured to:

generate the predicted image on a basis of an image formed by the image forming apparatus in a state where the charging device and the exposure device are nonoperational and the developing device is operational and on a basis of an image formed by the image forming apparatus in a state where the charging device, the exposure device, and the developing device are operational.

11. The information processing system according to claim 10, wherein the processor is configured to:

generate the predicted image on a basis of a component obtained by subtracting a component of the image formed by the image forming apparatus in the state where the charging device and the exposure device are nonoperational and the developing device is operational from a component of the image formed by the image forming apparatus in the state where the charging device, the exposure device, and the developing device are operational.

12. The information processing system according to claim 6, wherein the processor is configured to:

generate a reception screen used to receive specification of a measure by the user, the reception screen including an image formed by the image forming apparatus and cause information that is information regarding a cause of an image defect of the image formed by the image forming apparatus.

13. The information processing system according to claim 12, wherein the processor is configured to:

acquire the cause information on a basis of a first nonoperation image and a second nonoperation image, the first nonoperation image being an image formed by the image forming apparatus in a state where one or more devices of a plurality of devices included in the image forming apparatus are nonoperational, the second nonoperation image being an image formed by the image forming apparatus in a state where a device a count of which is greater than or lower than a count of the one or more nonoperational devices is nonoperational.

14. The information processing system according to claim 12, wherein the image forming apparatus is provided with a charging device that charges an image holder, an exposure device that performs light exposure on the image holder charged by the charging device, and a developing device that adheres a developer to the image holder having undergone the light exposure by the exposure device, and wherein the processor is configured to:

acquire the cause information on a basis of an image formed by the image forming apparatus in a state where the charging device and the exposure device are nonoperational and the developing device is operational.

15. The information processing system according to claim 1, wherein the image forming apparatus is provided with a plurality of image forming units that each form an image and include a plurality of devices, and wherein the processor is configured to:

in generating the predicted image for an image to be formed by an image forming unit of the image forming units in response to the measure decided in accordance with the measure information indicating exchange between a device of the devices included in the image forming unit and a device of the devices included in a different image forming unit of the image forming units, acquire first difference information that is information regarding a difference between an image formed by the image forming unit in a state where the device serving as an exchange target device of the plurality of devices included in the image forming unit is operational and an image formed by the image forming unit in a state where the device serving as the exchange target device is nonoperational and second difference information that is information regarding a difference between an image formed by the different image forming unit in a state where the device serving as an exchange target device of the plurality of devices included in the different image forming unit is operational and an image formed by the different image forming unit in a state where the device serving as the exchange target device is nonoperational; and generate the predicted image for the image to be formed by the image forming unit, on a basis of an image formed by the image forming unit in a state where the plurality of devices included in the image forming unit are operational, the first difference information, and the second difference information.

16. The information processing system according to claim 15, wherein the processor is configured to:

generate the predicted image on a basis of a component obtained by executing a process for subtracting an image component decided from the first difference information from a component of the image formed by the image forming unit in the state where the plurality of devices included in the image forming unit are operational and a process for adding an image component decided from the second difference information to the component of the image formed by the image forming unit in the state where the plurality of devices included in the image forming unit are operational.

17. The information processing system according to claim 6, wherein the processor is configured to:

generate a reception screen used to receive specification of a measure by the user, the reception screen including a candidate measure that satisfies a condition input by the user.

18. A non-transitory computer readable medium storing a program causing a computer to execute a process comprising:

acquiring a read image acquired by reading an image on a recording medium formed by an image forming apparatus, analyzing the image included in the read image and acquiring a diagnostic result;

acquiring measure information serving as information regarding a measure that is allowed to be implemented on the image forming apparatus and reading out a measure associated with the diagnosis result, the measure information including information regarding at least one of piece replacement or image correction processing;

deciding one or more candidate measures to be presented to a user based on the image on the recording medium formed by the image forming apparatus;

generating a screen including the image, the diagnosis result and the one or more candidate measures; and generating a predicted image serving as an image predicted to be acquired in response to the image forming apparatus forming an image after the one or more candidate measures decided in accordance with the measure information is selected by the user and implemented based on the read image and the measure information.

19. An information processing system comprising:

a processor configured to:

acquire measure information that is information regarding a measure allowed to be implemented for an image forming apparatus that forms an image on a recording medium; and generate a predicted image that is an image predicted to be acquired in response to the image forming apparatus forming an image after a measure decided in accordance with the measure information is implemented, wherein the image forming apparatus is provided with a charging device that charges an image holder, an exposure device that performs light exposure on the image holder charged by the charging device, and a developing device that adheres a developer to the image holder having undergone the light exposure by the exposure device, and wherein the processor is configured to:

generate the predicted image based on an image formed by the image forming apparatus in a state where the charging device and the exposure device are nonoperational and the developing device is operational and based on an image formed by the image forming apparatus in a state where the charging device, the exposure device, and the developing device are operational.

* * * * *